US011983550B2

(12) United States Patent
Sangilimuthu et al.

(10) Patent No.: US 11,983,550 B2
(45) Date of Patent: May 14, 2024

(54) VIEW CUSTOMIZATION IN CRM APPLICATION

(71) Applicant: ZOHO Corporation Private Limited, Chengalpattu Taluk (IN)

(72) Inventors: Muthuraja Sangilimuthu, Chengalpattu Taluk (IN); Tamilarasan Selvaraj, Chengalpattu Taluk (IN); Vijay Sekar, Tiruvannamalai (IN); Senthilkumar Subramanian, Srivilliputtur (IN); Selvabharathy, Vellakoil (IN); Kowsik Samynathan, Anthiyur (IN); Gobinath Selvam, Tirunelveli (IN)

(73) Assignee: ZOHO CORPORATION PRIVATE LIMITED, Chengalpattu Taluk (IN)

( * ) Notice: Subject to any disclaimer, the term of this patent is extended or adjusted under 35 U.S.C. 154(b) by 0 days.

(21) Appl. No.: 17/989,100

(22) Filed: Nov. 17, 2022

(65) Prior Publication Data

US 2023/0153130 A1 May 18, 2023

Related U.S. Application Data

(60) Provisional application No. 63/283,701, filed on Nov. 29, 2021, provisional application No. 63/280,347, filed on Nov. 17, 2021.

(51) Int. Cl.
*G06F 40/00* (2020.01)
*G06F 9/451* (2018.01)
*G06F 40/106* (2020.01)

(52) U.S. Cl.
CPC ............ *G06F 9/451* (2018.02); *G06F 40/106* (2020.01)

(58) Field of Classification Search
CPC ...................................................... G06F 40/106
See application file for complete search history.

(56) References Cited

U.S. PATENT DOCUMENTS

| | | | |
|---|---|---|---|
| 8,645,902 B1 * | 2/2014 | Yu ......................... | G06F 30/398 716/139 |
| 9,053,289 B1 * | 6/2015 | Lamant ............... | G06F 3/04845 |
| 10,169,307 B2 | 1/2019 | Abrahami | |
| 10,789,412 B2 | 9/2020 | Abrahami et al. | |
| 10,824,793 B2 | 11/2020 | Fialkow | |
| 10,984,177 B2 | 4/2021 | Fialkow et al. | |
| 11,016,651 B1 * | 5/2021 | Black ...................... | G06F 16/34 |
| 11,112,927 B2 * | 9/2021 | Biswas ................ | G06V 30/414 |
| 2005/0094206 A1 * | 5/2005 | Tonisson ............... | G06F 40/186 358/1.18 |
| 2006/0174194 A1 * | 8/2006 | Miyazawa ............ | G06F 40/114 715/247 |

(Continued)

*Primary Examiner* — Barbara M Level
(74) *Attorney, Agent, or Firm* — Ahmann Kloke LLP

(57) ABSTRACT

Disclosed are techniques to facilitate Customer Relationship Management (CRM) data utilization and display to suit organizational and team goals, methods, requirements, and more. A system can include a CRM page building engine, a layout building engine, a rendering engine, a request handing engine, a CRM datastore, a component datastore, and a layout datastore. For example, a design system can be implemented as a no-code builder that facilitates creation through a drag-and-drop interface, which is intuitive and user-friendly.

14 Claims, 26 Drawing Sheets

(56) References Cited

U.S. PATENT DOCUMENTS

| | | | | |
|---|---|---|---|---|
| 2006/0200759 A1* | 9/2006 | Agrawala | ............. | G06F 40/103 715/209 |
| 2006/0259860 A1* | 11/2006 | Kobashi | ................ | G06F 40/106 715/209 |
| 2009/0254814 A1* | 10/2009 | Lai | ........................ | G06F 40/186 715/244 |
| 2013/0194297 A1* | 8/2013 | Theophil | ............... | G06F 40/103 345/660 |
| 2015/0074516 A1* | 3/2015 | Ben-Aharon | ....... | G06F 16/9577 715/234 |
| 2017/0337321 A1* | 11/2017 | Hoford | ................. | G06F 30/398 |
| 2019/0108201 A1 | 4/2019 | Abrahami et al. | | |
| 2020/0110793 A1 | 4/2020 | Sullivan et al. | | |
| 2021/0103515 A1* | 4/2021 | Jiang | ..................... | G06F 40/143 |
| 2022/0253411 A1* | 8/2022 | Sammons | ................. | G06F 8/34 |
| 2022/0327279 A1* | 10/2022 | Long | ..................... | G06F 40/106 |
| 2023/0044682 A1* | 2/2023 | Shang | .................... | G06F 40/106 |

* cited by examiner

Client Info

| | |
|---|---|
| Email | meyer@gmail.com |
| Phone | +1 898 555 898 |
| Mobile | +1 989 888 8958 |
| Twitter | ChloeMeyerChris |
| Skype ID | chloe.meyer.sample |

Chloe Meyer
Christ Cafe

CM

[Edit] [Send Email] [...]

Address Info

| | |
|---|---|
| Mailing Street | 4141 Hacienda Dr |
| Mailing City | Pleasonton |
| Mailing State | CA |
| Mailing Zip | 94588 |

Overview | Emails | Atachments | Invited Meetings | Notes | Timeline | All Fields | Cases

Social

CM Chloe Meyer

[Follow] [Tweet]

| Tweets | Following | Followers | Likes |
|---|---|---|---|
| 3 | 0 | 0 | 0 |

Interactions  Message  Filter By: Zyllker Realtors ▾  Show: All ▾  [Streams]

CM Chloe Meyer tweeted on          14 Jun
I had a great time today. Thanks for the useful session on property appraisal process.    [Client]

CM Chloe Meyer tweeted on          14 Jun
No response to my email. Could you get back to me at the earliest? Thanks.    [Client]

CM Chloe Meyer tweeted on          12 Jun
Thanks for the email. Look forward to our next appointment!    [Client]

5300

VIEW CUSTOMIZATION IN CRM APPLICATION

CROSS-REFERENCE TO RELATED APPLICATIONS

This application claims benefit to U.S. Provisional Application No. 63/280,347 entitled "NO CODE DESIGN STUDIO TO PROVIDE VIEW CUSTOMIZATION BASED ON BUSINESS NEED IN CRM APPLICATION", and filed on Nov. 17, 2021, and claims benefit to U.S. Provisional Application No. 63/283,701 entitled "NO CODE DESIGN STUDIO TO PROVIDE VIEW CUSTOMIZATION BASED ON BUSINESS NEED IN CRM APPLICATION", filed on Nov. 29, 2021, which is incorporated herein by reference in its entirety.

TECHNICAL FIELD

The technical field is in Customer Relationship Management (CRM) page design.

BACKGROUND

Customer Relationship Management (CRM) may be used by teams within an organization, with each team having different goals, methods, and requirements. A team within an organization may have a reason to have fields, buttons, widgets, and more displayed a certain way, which can be different from that of another team, even within the same organization. This intrinsic difference would likely become larger when a comparison is made between different organizations and/or industries.

Organizations invest in CRM applications to accelerate sales and streamline business processes. Ironically, it becomes a perennial challenge to get users to warm up to the CRM system, make critical database entries, and exploit the capabilities of the application. The reason for poor adoption rates is often an unfriendly UI with rigid, limited possibilities of customization for individual teams.

When the inherent user experience is poor, there's also a need to train employees to navigate their way across the application or bring in third-party expert developers to customize it in a way that suits the specific needs of an organization, in the hopes of increasing adoption rates. In either case, there is an additional expenditure involved in the form of time or money. So to sum up, in order to realize gains from a previous investment already made in the first place, an organization ends up paying even more.

SUMMARY

Customers can redesign list and detail views of Customer Relationship Management (CRM) data to suit organizational and team goals, methods, requirements, and more. For example, a design system can be implemented as a no-code builder that facilitates creation through a drag-and-drop interface, which is intuitive and user-friendly.

BRIEF DESCRIPTION OF THE DRAWINGS

FIG. 1 is a sample screenshot of a contact page.

FIG. 39 is a sample screenshot of a CRM application illustrating a customer profile CRM element.

FIG. 53 is a sample screenshot of a client's detail page design for a marketing agent.

DETAILED DESCRIPTION

Customer Relationship Management (CRM) page design is described. In a specific implementation, ZOHO® CRM is provided via CANVAS™, a no-code, drag-and-drop design system; the design system can be readily integrated with other software applications, e.g. ZOHO Creator, ZOHO Expenses, ZOHO Payroll, ZOHO Recruiter, or the like to generate view customization, where customers can reimagine the UI of CRM on a blank canvas. Design and data packaging have a subjective aesthetic component, so the CRM page design system has a wide range of features and formatting options. This helps to create an application that feels like its personalized and customized down to the last detail. However, the aesthetics are coupled with custom CRM elements that ensure functionality and ease of use are ensured. To this end, a User Interface (UI) has been developed that provides multiple ways to offer a highly personalized user experience to multiple teams with a motivation "to each their own". Techniques described in this paper enable a design system to provide view customization based on business need in a CRM application with tools that facilitate ease of use while maintaining functionality.

Figure 1:
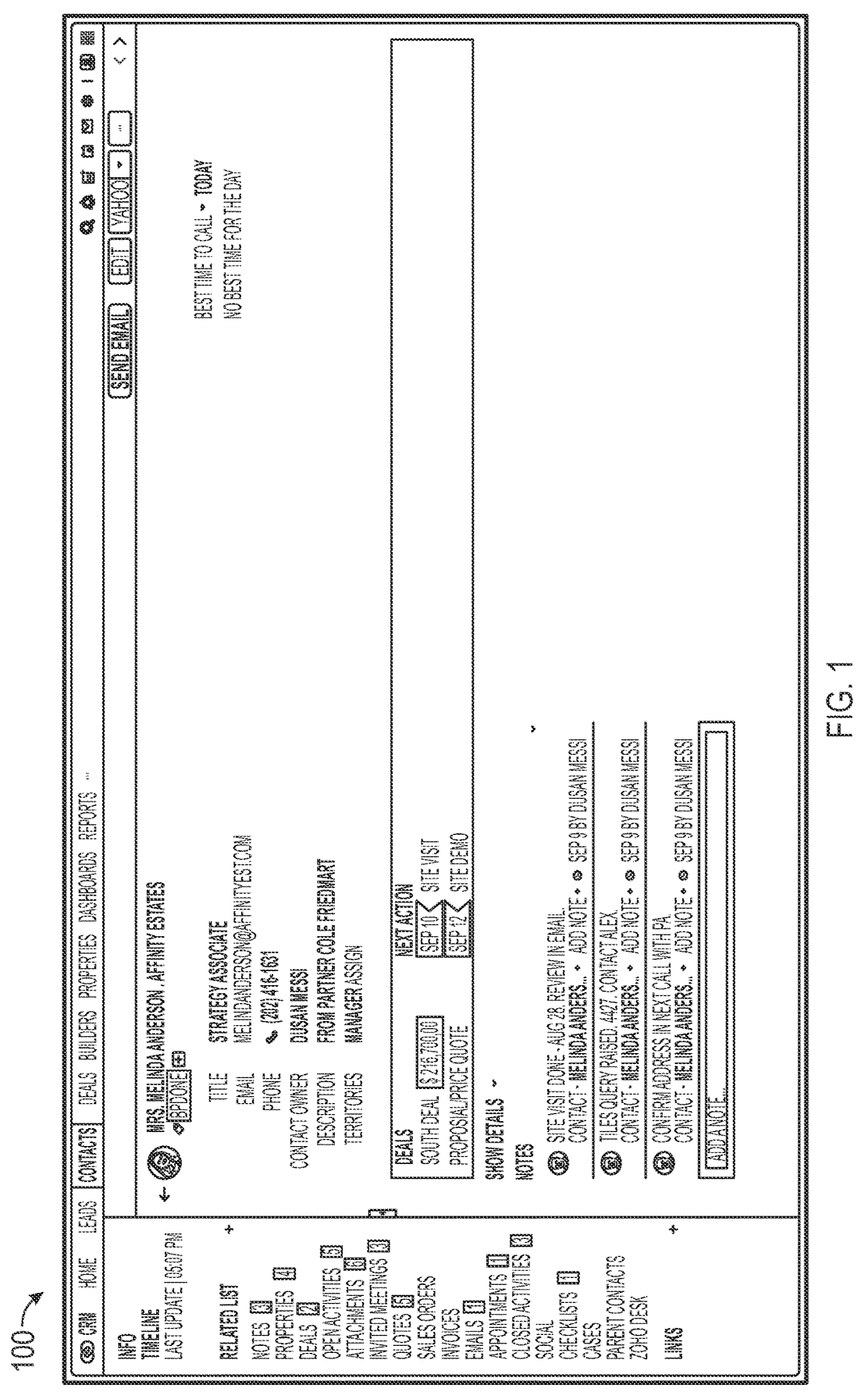

FIG. 1 is a sample screenshot 100 of a contact page. The contact page provides data, but a team may wish for a more customized page to meet expectations, improve readability, display CRM elements deemed most applicable to a team in the most obvious places, or the like.

Figure 2:
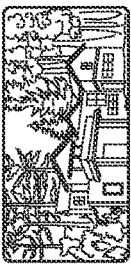
FIG. 2 is a sample screenshot of a Custom Relationship Management (CRM) contact page built using a CRM page design system.

FIG. 2 is a sample screenshot 200 of a Custom Relationship Management (CRM) contact page built using a CRM page design system.

Figure 3:
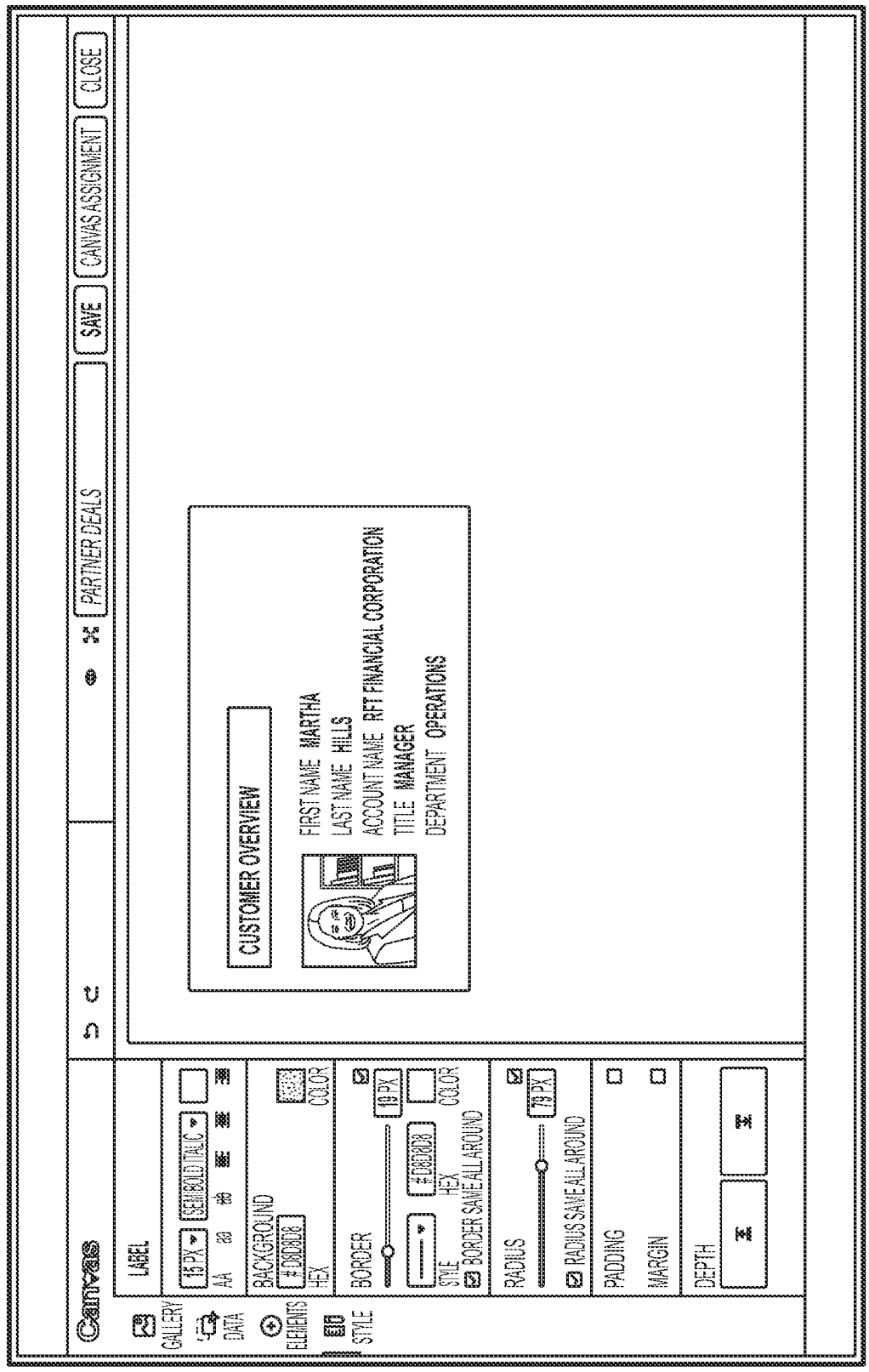
FIG. 3 is a sample screenshot of a CRM page being designed using a CRM page design system.

FIG. 3 is a sample screenshot 300 of a CRM page being designed using a CRM page design system. By organizing CRM elements the way an organization (or team) wants and applying attractive designs, the UI not only makes the layouts presentable, but also extremely functional by offering the users exactly what they are looking for, the moment they land on the page, where they are most likely to look for it. Making the CRM layouts relevant and contextual goes a long way in getting the users to be consistent in using the CRM. What this also means is that the organization can slash training efforts and save costs on third party intervention to customize the application.

Figure 4:
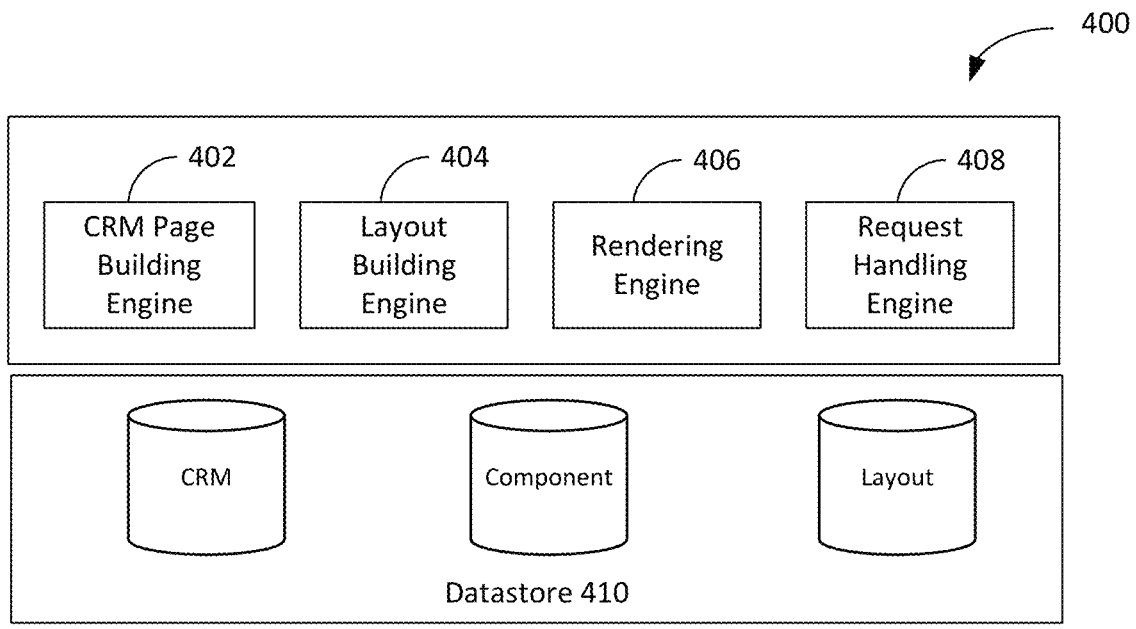
FIG. 4 is a diagram of an example of CRM page design system.

FIG. 4 is a diagram 400 of an example of CRM page design system. In a specific implementation, the CRM page design system is a no code, layout-based design system. It comprises a CRM page building engine 402, a layout building engine 404, a rendering engine 406, a request handling engine 408, and a datastore 410. In a client-server implementation with a server coupled to a client via a network, engines of the CRM page design system exist at the server, at the client, or portions thereof at both server and client. The CRM page design system can also be implemented as an independent computer system. In a specific implementation, the datastore 410 comprises raw JavaScript Object Notation (JSON) data henceforth called component data, Hyper Text Markup Language (HTML) JSON data henceforth called layout data, and CRM data. In a specific implementation, the CRM data (and/or other data) is maintained in a database, but some or all the data can be maintained in a database or, more generally, a datastore.

Networks discussed in this paper are intended to include all communication paths that are statutory (e.g., in the United States, under 35 U.S.C. 101), and to specifically exclude all communication paths that are non-statutory in nature to the extent that the exclusion is necessary for a claim that includes the communication path to be valid. Known statutory communication paths include hardware (e.g., registers, random access memory (RAM), non-volatile (NV) storage, to name a few), but may or may not be limited to hardware.

Communication paths discussed in this paper are intended to represent a variety of potentially applicable technologies. For example, a network can be used to form a network or part of a network. Where two components are co-located on a device, a network can include a bus or other data conduit or plane. Where a first component is co-located on one device and a second component is located on a different device, a network can include a wireless or wired back-end network or LAN. A network can also encompass a relevant portion of a WAN or other network, if applicable.

The devices, systems, and communication paths described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

A computer system can be implemented as an engine, as part of an engine or through multiple engines. As used in this paper, an engine includes one or more processors or a portion thereof. A portion of one or more processors can include some portion of hardware less than all the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

Engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

Figure 5:
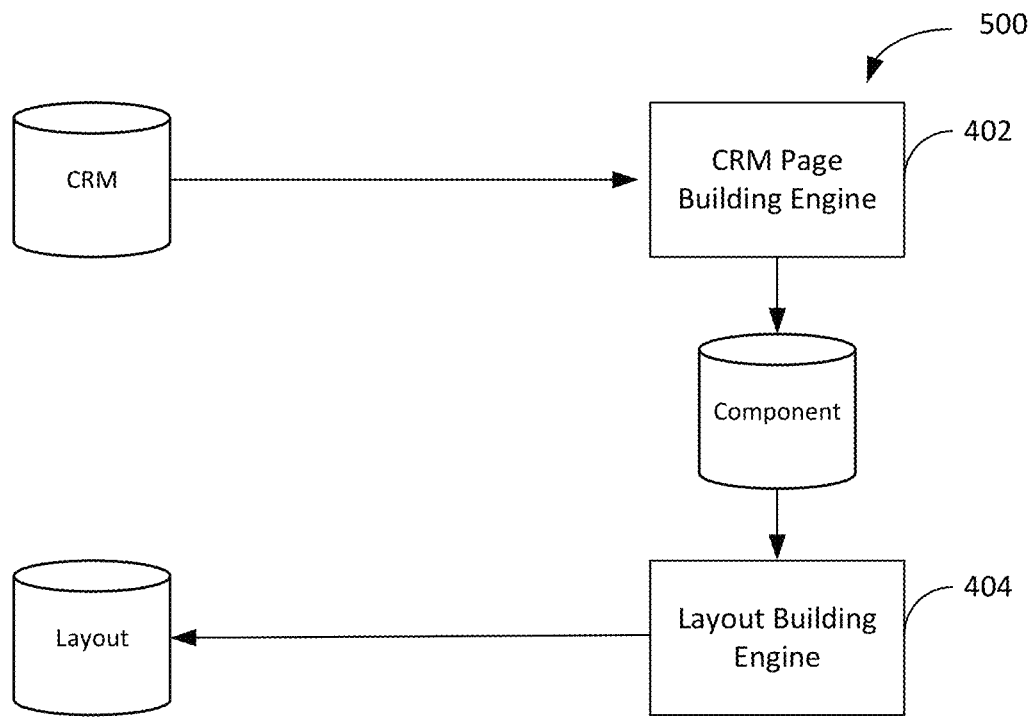
FIG. 5 is a block diagram of components of a CRM page design system involved in page building.

FIG. 5 is a block diagram 500 of components (using the same reference numerals as in FIG. 4, above) of a CRM page design system involved in page building. While building a CRM page the CRM page building engine and layout building engine are involved. The CRM page building engine is a UI building tool that generates frontend based on API data from CRM datastore, e.g., Zoho CRM database. Other application datastores, e.g., Zoho Creator, Zoho Expense, Zoho Payroll, Zoho Recruiter, etc., can also be deployed while building a CRM page for corresponding applications.

In a specific implementation, the CRM page building engine helps in creating a UI as per organizational, team, or user preferences or requirements, through easy drag and drop operations. In a specific implementation, the CRM page building engine provides an easy-to-use builder UI with selection pane, data pane, style menu, etc. A selection pane on UI renders various components e.g., Button, Table, Fields, Section, etc. CRM elements can be dragged from the selection pane and dropped on a canvas while designing a CRM page.

The CRM page building engine UI in ready state will have data from the CRM datastore, defined so that it can be customized easily according to the design. The CRM page building engine will convert the fetched data to builder-recognizable format and load it into a data pane. The data might include, for example, fields, related lists, and actions. CRM elements can be dragged from the data pane and dropped on a canvas while designing a CRM page. A set of supporting elements to organize the data, like table, section, etc., may or may not also be available on the data pane.

The CRM page building engine also provides options to render style property to the components placed on the canvas, through the style menu. When data fields are dragged from the data pane and dropped on the canvas area, a corresponding CRM element's position will be marked with dimensions. In a specific implementation, after being dropped on the canvas, each CRM element will be assigned a unique identity, which may or may not be pseudo-randomly generated. A style property can be selected from the style menu and assigned to a CRM element. For example, the style property can be appended to the unique identity of the corresponding CRM element.

Once the designing of the CRM page is completed, component data of each CRM element (including, for example, field dimension, position, and style) is saved with its unique identity in, e.g., a tree format.

Designing of the CRM page can be done in multiple ways. Two examples of such are:
  a) The CRM page design system comprises a gallery that includes a default set of templates to create CRM pages. A user can choose a suitable template and customize it based on preferences and/or requirements. It incorporates a smart grid option that provides a guide to place a CRM element so as to line up with previously placed CRM elements to ensure alignment. The gallery could also contain a default set of layouts.
  b) The CRM page design system provides flexibility to build a CRM page from scratch. In such a scenario, the CRM page design system will provide a blank, free flow canvas area to design a CRM page. The user can drag and drop desired CRM elements on the canvas. A layout is generated according to the CRM elements on the canvas.

The layout building engine generates a layout for a page designed with CRM elements that were dragged and dropped onto the canvas. The CRM elements and corresponding CRM element data are included in a CRM element list. The layout building engine processes the CRM element data of each CRM element in the CRM element list and generates HTML equivalent JSON, referred to as Layout data. The CRM element data of a CRM element comprising absolute positions of the CRM element, may not be usable as such, due to potentially dynamic data size. Thus, the CRM element data of each CRM element is processed by the layout building engine to generate layout data. A layout is created using the layout data to accommodate all components and data records placed on the canvas.

Layout building engine processes the CRM element data which comprises the absolute position of the CRM element on the canvas. The layout building engine performs grouping and/or sub-grouping process to wrap the CRM element in the layout. The layout building engine outputs Layout data for each component. It is stored in a temporary storage, e.g., Zettabyte File System (ZFS), Redis.

In a specific implementation, the layout data of each CRM element comprises position, background, size, component unique information, text style, image data, actionable information, etc. It also includes information about its neighbor(s), which are referred to as "disturbing CRM elements" if they satisfy conditions as described below. (Not all neighboring elements are disturbing CRM elements, but neighbors satisfying this condition are described below.)

Figure 6:
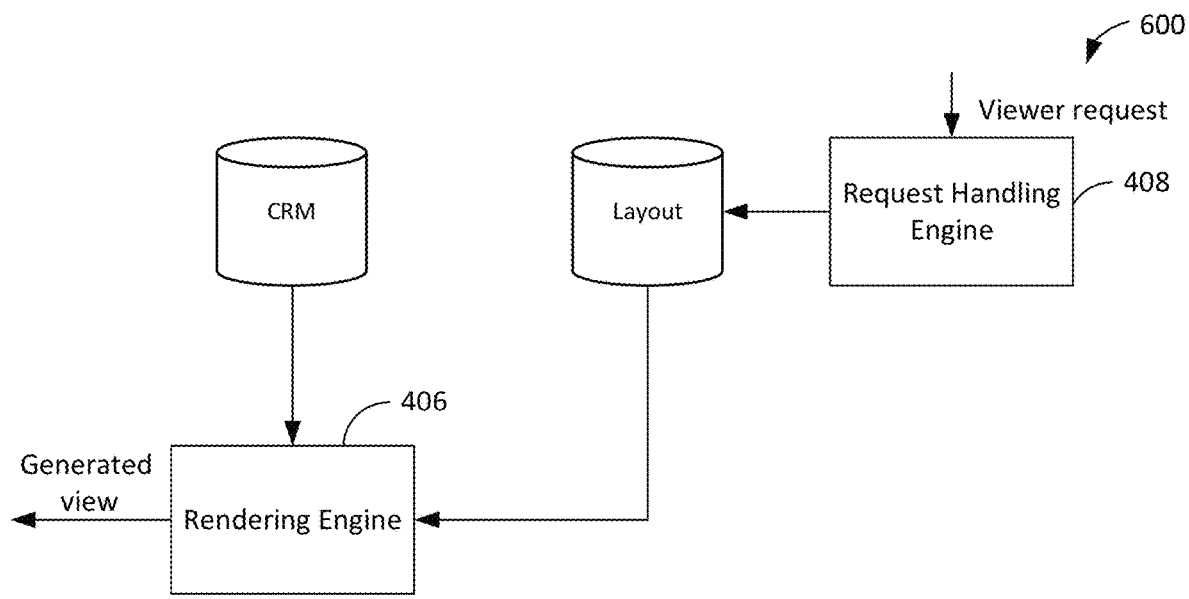
FIG. 6 illustrates components of a CRM page design system involved in page rendering.

FIG. 6 is a block diagram 600 of components (using the same reference numerals as in FIG. 4, above) of a CRM page design system involved in page rendering. It includes the layout building engine, a rendering engine, and a request handling engine. In a specific implementation, when a CRM page built using canvas is visited, a request handling engine handles the visitor's request. Application metadata and CRM page contextual data (or record) is fetched from the CRM datastore. Layout data is also fetched from a layout datastore. If it fails, then CRM element data is fetched from a CRM element datastore and processed by the layout building engine again.

On Successful fetching of all the required data, the Layout data will be mapped with the CRM data and its application components, based on its type and action to be performed. The application will already have a set of predefined components for the data field value formatting and actions. For example, Currency, Date formatting will be handled by the application. Those application components will be mapped into the HTML, code based on the unique identity of data on the canvas.

The rendering engine comprises a HTML code generator and a view generator. The HTML code generator generates the HTML code based on the application component comprising Layout and CRM data. It generates code as chunks corresponding to each application component. Each chunk is registered as a CRM element for data binding and caching purposes. The generated CRM elements are placed on a CRM page. The view generator generates a view of the canvas using the HTML code chunks generated by the code generator. The HTML code generated resembles the human coded HTML.

Figure 7:
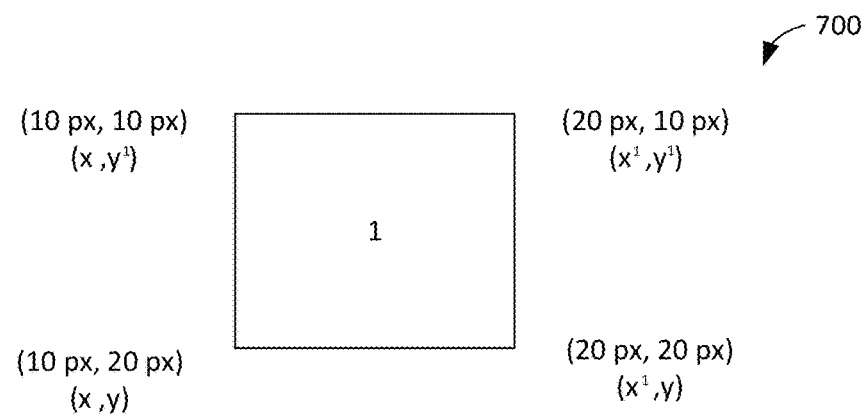
FIG. 7 is an illustration of a sample of a CRM element placed on the canvas.

CRM elements placed on a canvas can be referred to using their position coordinates (PC). An example of a CRM element placed on the canvas and the PC of the CRM element is depicted in illustration 700 of FIG. 7. The CRM element can be characterized as having a graphical display component with a boundary (or boundaries on each of its sides) that includes the portion of the CRM element that is displayed. Although, depending upon context, the CRM element itself may be considered a graphical display element, in general, CRM elements in a layout include a graphical display component, a fixed position coordinate at a first boundary of the graphical display component, and a dynamic position coordinate at a second boundary of the graphical display component opposite the first boundary in the static direction of a unidirectional expansion vector.

In a specific implementation, CRM elements must be linked and locked together as one wrapped component to design a dynamic layout. CRM elements to be linked and locked along the vertical axis require their coordinate/pixel values along the vertical axis. The coordinate values of the component "1" can be denoted using the format, 1 (x,x'), where x-denotes the starting position value and x' denotes the ending position value. The coordinate values along the horizontal axis can be denoted as 1 (y,y').

When the CRM elements are to be linked along the vertical X-axis, the CRM elements' x coordinate position (starting and ending) values are needed. The starting and ending coordinate values of the component can be denoted using the label (x,x') along the X-axis. Similarly, the starting and ending coordinate values of the component can be denoted using the label (y,y') along the Y-axis.

There could be multiple instances for one CRM element to be a disturbing CRM element to another CRM element. CRM element "1" PC values along the y axis are fetched for determining a set of disturbing CRM elements along the horizontal axis. The starting and ending PC values of CRM element "1" is compared with the starting and ending PC values of CRM element "2". There are different instances when the PC value of CRM element "2" may lie within the range of the PC value of CRM element "1" as stated below:
  (a) CRM element "2" starting PC value lies between the starting and ending PC value of CRM element "1" and vice versa
  (b) CRM element "2" ending PC value lies between the starting and ending PC value of CRM element "1" and vice versa
  (c) CRM element "2" starting and ending PC values lie within the starting and ending PC values of CRM element "1" and vice versa
  (d) The PC value of CRM element "2" is the same as the PC value of CRM element "1" and vice versa CRM element "1" PC values along the x axis fetched for determining a set of disturbing CRM elements along the vertical axis. The starting and ending PC values of CRM element "1" are compared with the starting and ending PC values of CRM element "2". There are different instances when the PC value of CRM element "2" may lie within the range of the PC value of CRM element "1" as stated below:
  (a) CRM element "2" starting PC value lies between the starting and ending PC value of CRM element "1" and vice versa.
  (b) CRM element "2" ending PC value lies between the starting and ending PC value of CRM element "1" and vice versa.
  (c) CRM element "2" starting and ending PC values lie within the starting and ending PC values of CRM element "1" and vice versa.
  (d) The PC value of CRM element "2" is the same as the PC value of CRM element "1" and vice versa.

Figure 8:
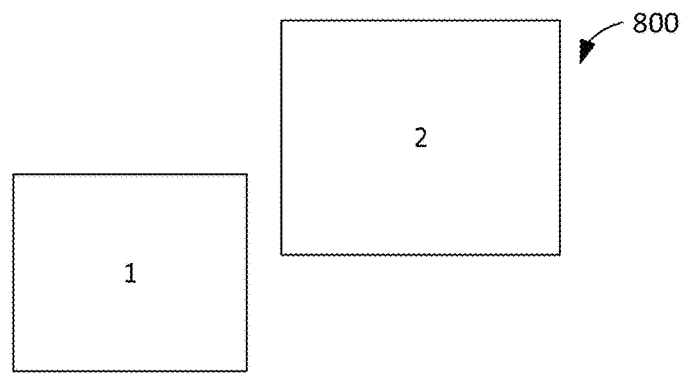
FIGS. 8-15 are sample screenshots of a disturbing CRM element scenarios.
Figure 9:
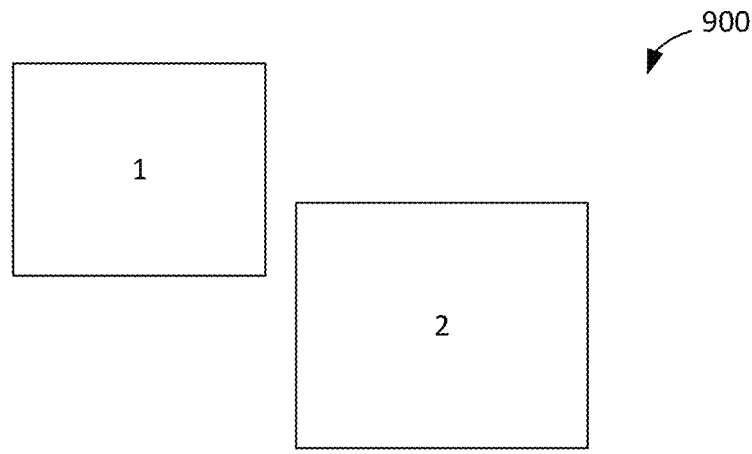
Figure 10:
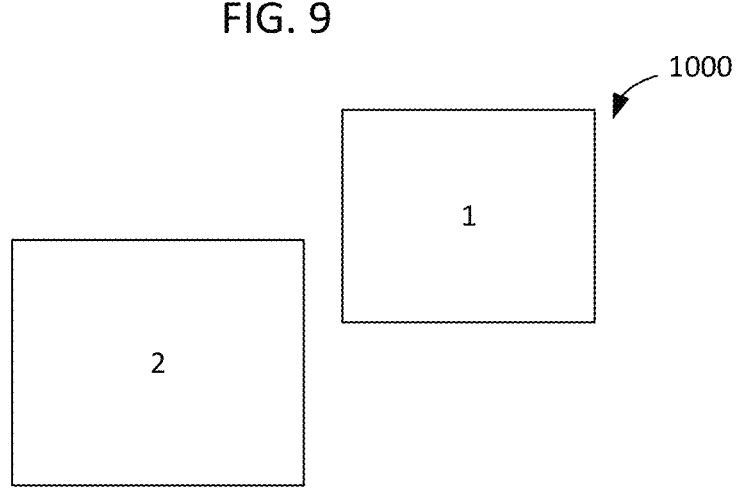
Figure 11:
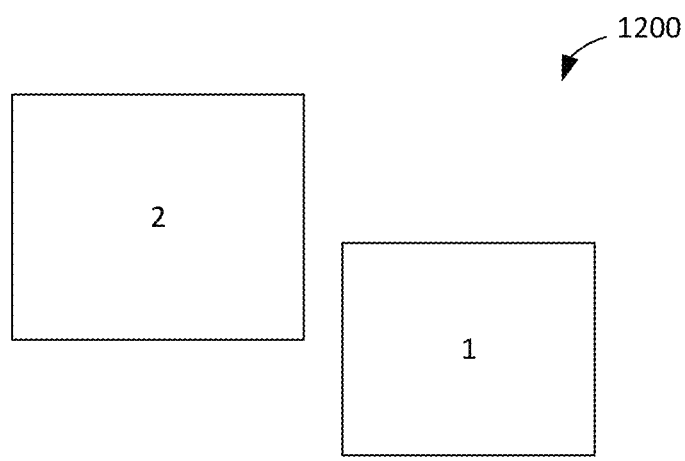
Figure 12:
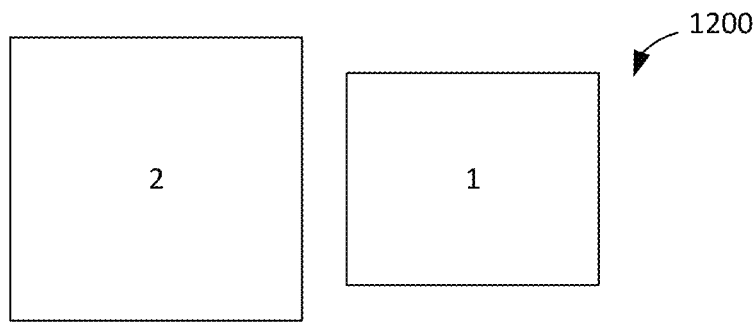
Figure 13:
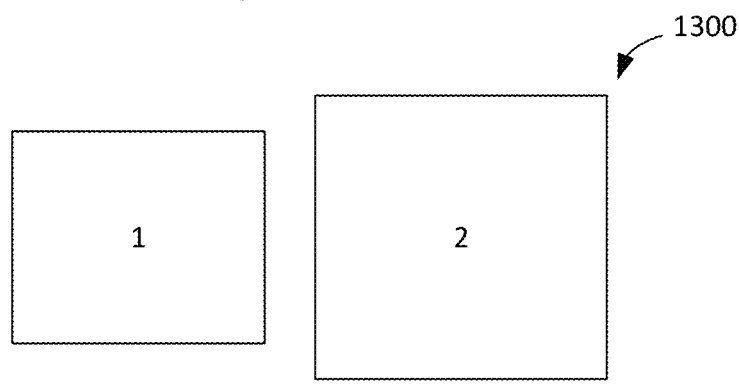
Figure 14:
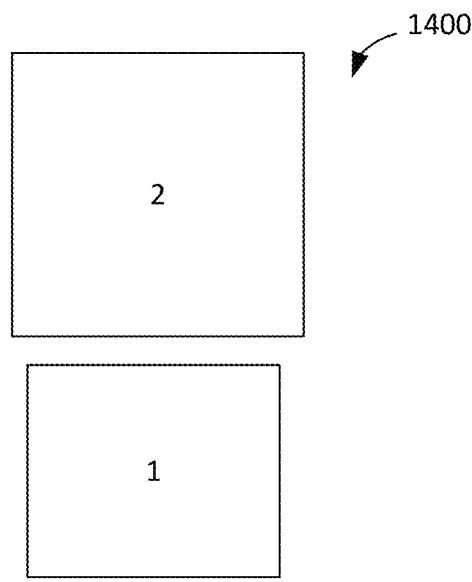
Figure 15:
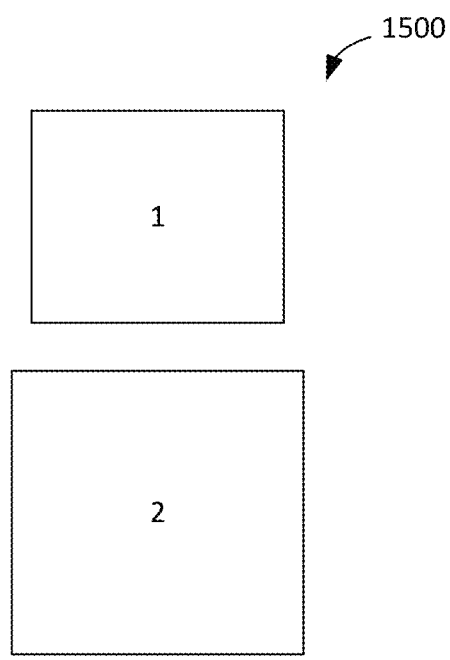

Some of the instances where a disturbing CRM element is identified are described below:
  (i) FIG. 8 gives a sample screenshot 800 of first scenario where CRM element "2" is a disturbing CRM element to CRM element "1" along the horizontal axis. The PC of CRM element "2" is near the PC of CRM element "1" along the horizontal axis towards its right top. Hence, if CRM element "1" extends, it might disturb the CRM element "2" and vice versa. "Near" includes both overlapping and having a position that is defined to be closer than is aesthetically or functionally (e.g., for readability) ideal, as determined by implementation, configuration, and preference-specific factors.
  (ii) FIG. 9 gives a sample screenshot 900 of second scenario where CRM element "2" is a disturbing CRM element to CRM element "1" along the horizontal axis. The PC of CRM element "2" is near the PC of CRM element "1" along the horizontal axis towards its right bottom. Hence, if CRM element "2" extends, it might disturb the CRM element "1" and vice versa.
  (iii) FIG. 10 gives a sample screenshot 1000 of third scenario where CRM element "2" is a disturbing CRM element to CRM element "1" along the horizontal axis. The PC of CRM element "2" is near the PC of CRM element "1" along the horizontal axis towards its left bottom. Hence, if CRM element "2" extends, it might disturb the CRM element "1" and vice versa.
  (iv) FIG. 11 gives a sample screenshot 1100 of fourth scenario where CRM element "2" is a disturbing CRM element to CRM element "1" along the horizontal axis. The PC of CRM element "2" is near the PC of CRM element "1" along the horizontal axis towards its left top. Hence, if CRM element "2" extends, it might disturb the CRM element "1" and vice versa.
  (v) FIG. 12 gives a sample screenshot 1200 of fifth scenario where CRM element "2" is a disturbing CRM element to CRM element "1" along the horizontal axis. The PC of CRM element "2" is near the PC of CRM element "1" along the horizontal axis towards its left. Hence, if CRM element "2" extends, it might disturb the CRM element "1" and vice versa.
  (vi) FIG. 13 gives a sample screenshot 1300 of sixth scenario where CRM element "2" is a disturbing CRM element to CRM element "1" along the horizontal axis. The PC of CRM element "2" is near the PC of CRM element "1" along the horizontal axis towards its right. Hence, if CRM element "2" extends, it might disturb the CRM element "1" and vice versa.
  (vii) FIG. 14 gives a sample screenshot 1400 of seventh scenario where CRM element "2" is a disturbing CRM element to CRM element "1" along the vertical axis. The PC of CRM element "2" is near the PC of CRM element "1" along the vertical axis towards its top. Hence, if CRM element "2" extends, it might disturb the CRM element "1" and vice versa.
  (viii) FIG. 15 gives a sample screenshot 1500 of eighth scenario where CRM element "2" is a disturbing CRM element to CRM element "1" along the vertical axis. The PC of CRM element "2" is near the PC of CRM element "1" along the vertical axis towards its bottom. Hence, if CRM element "2" extends, it might disturb the CRM element "1" and vice versa.

The set of disturbing CRM elements are linked in the vertical or horizontal axis to create a dynamic layout. A CRM element is instantiated by identifying CRM data for display within the CRM element. The variable magnitude of a unidirectional expansion vector for the CRM element is determined. The unidirectional expansion vector magnitude is associated with the size required to display the CRM data in the graphical display component of the CRM element. In CRM applications, the vertical CRM use case are usually preferred by the customers. When the amount of data increases vertically downwards, it facilitates vertical scrolling of pages to view. This helps the customers of CRM application in viewing the pages with a minimum of effort. Hence, layout building engine begins with linking of components vertically. Accordingly, the vertical CRM use case is described in the examples provided in this paper.

Assuming Y-axis is vertical, and X-axis is horizontal on a page, the page related functionalities that are performed are as follows:
  The CRM elements on a page are allowed to extend in size only along the Y-axis (vertical) in the downward direction. In a specific implementation, the top/upper edge of an element does not move/change/adapt to the amount of data.

In the first level, CRM elements are wrapped vertically and are linked/locked vertically relative to each other (in sequence or order) and can only be moved together (left or right) along the X-axis (horizontal).

At the second level, CRM elements are wrapped horizontally and are linked/locked horizontally relative to each other (in sequence or order) and can only be moved together (upward or downward) vertically.

The above two steps are carried out recursively until there is only one CRM element in each wrapped CRM element. This is done to link the CRM elements in the vertical or horizontal axis. CRM elements on a page are allowed to extend in size only along the Y-axis (vertical) in the downward direction. In this implementation, only the bottom/lower edge of an element can extend downward or shrink upward depending on the amount of data it has to contain/display.

The layout data of each CRM element output by layout building engine comprises of position, background, size, component unique information, text style, image data, actionable information, etc. A CRM element that is allowed to expand in size in a single direction can be referred to as a CRM element with a unidirectional expansion vector. The unidirectional expansion vector of a CRM element includes a static direction and a variable magnitude.

Figure 16:
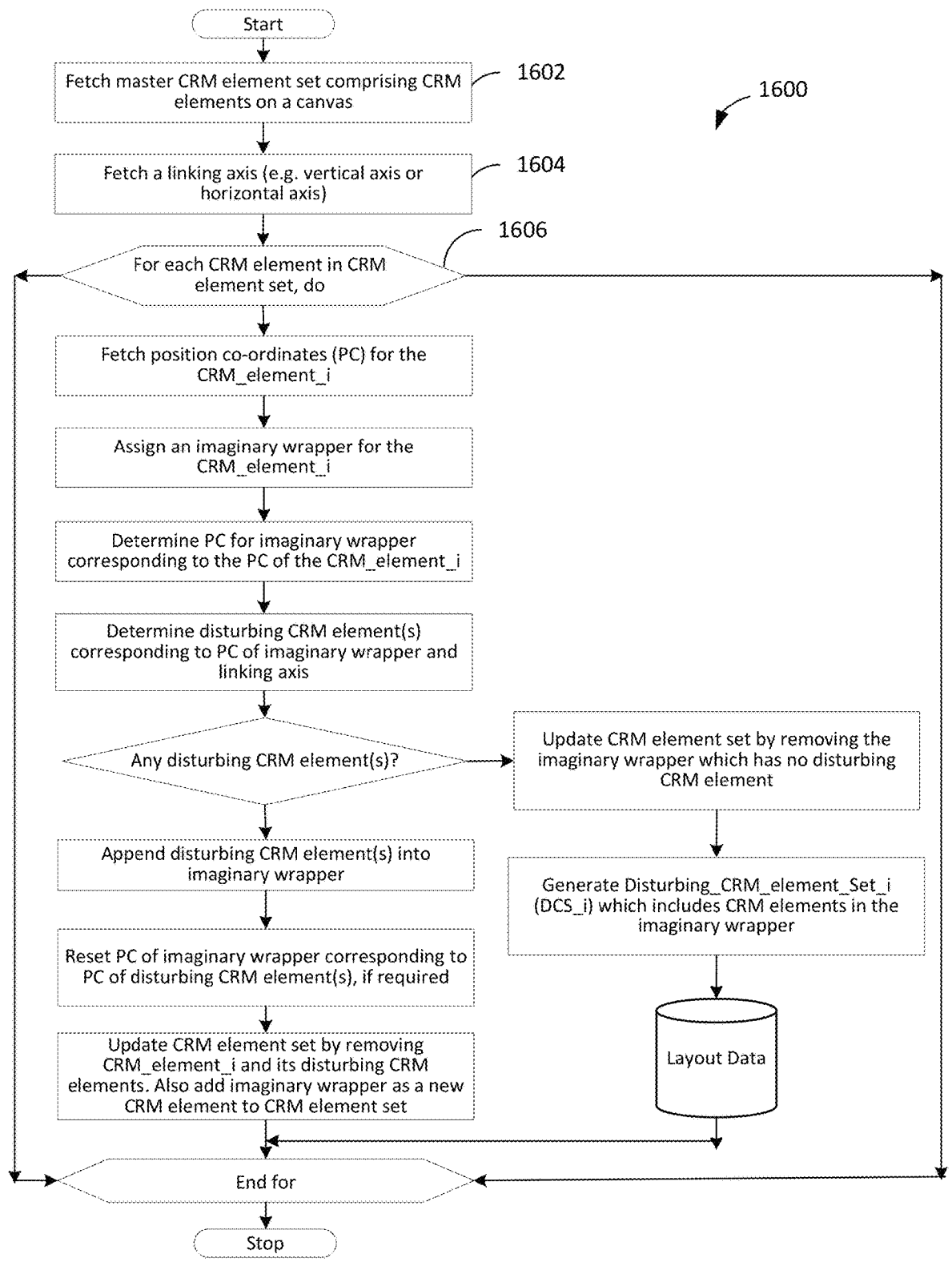
FIG. 16 is a flowchart of an example of a method for finding disturbing CRM elements.

FIG. 16 is a flowchart 1600 of an example of a method for finding disturbing CRM elements. The method determines disturbing CRM element sets for CRM elements in a CRM element set received as input. The CRM element set can be a master CRM element set comprising the CRM elements on canvas, stored in a CRM element datastore. The flowchart 1600 starts at module 1602 with fetching a CRM element set, which for the purpose of this example includes CRM elements on a canvas. The flowchart 1600 continues to module 1604 with fetching linking axis, e.g., vertical axis for vertical CRM use case. The flowchart 1600 continues to module 1606 where the following is carried out for each CRM element in the CRM element set.

The position coordinates (PC) for a CRM element say, CRM_element_i is fetched. An imaginary wrapper is assigned over the CRM_element_i. The PC of the CRM_element_i is assigned as the PC of the imaginary wrapper. The set of disturbing CRM elements corresponding to PC of imaginary wrapper along the linking axis is determined. If the set of disturbing elements is null, the CRM element set is updated by removing the imaginary wrapper (which has no disturbing CRM element). A disturbing CRM_element_set_i is generated which includes CRM elements in the imaginary wrapper (which has no disturbing CRM element) and is stored in the layout datastore. If, on the other hand, the set of disturbing CRM elements is not null for CRM_element_i along the linking axis, then the set of disturbing CRM elements is appended into imaginary wrapper. The PC of imaginary wrapper is reset to the PC of the set of disturbing CRM elements, if required. When there is only one CRM element, e.g., CRM_element_i, inside the imaginary wrapper, the PC of the imaginary wrapper is same as the PC of the CRM_element_i. When there is more than one CRM element inside the imaginary wrapper, then the PC of the imaginary wrapper corresponds to the PC of the first existing and last existing CRM elements along the linking axis. The CRM element set is updated by removing CRM_element_i and its set of disturbing CRM elements. Also, the imaginary wrapper is added as a new CRM element to the CRM element set.

Figure 17:
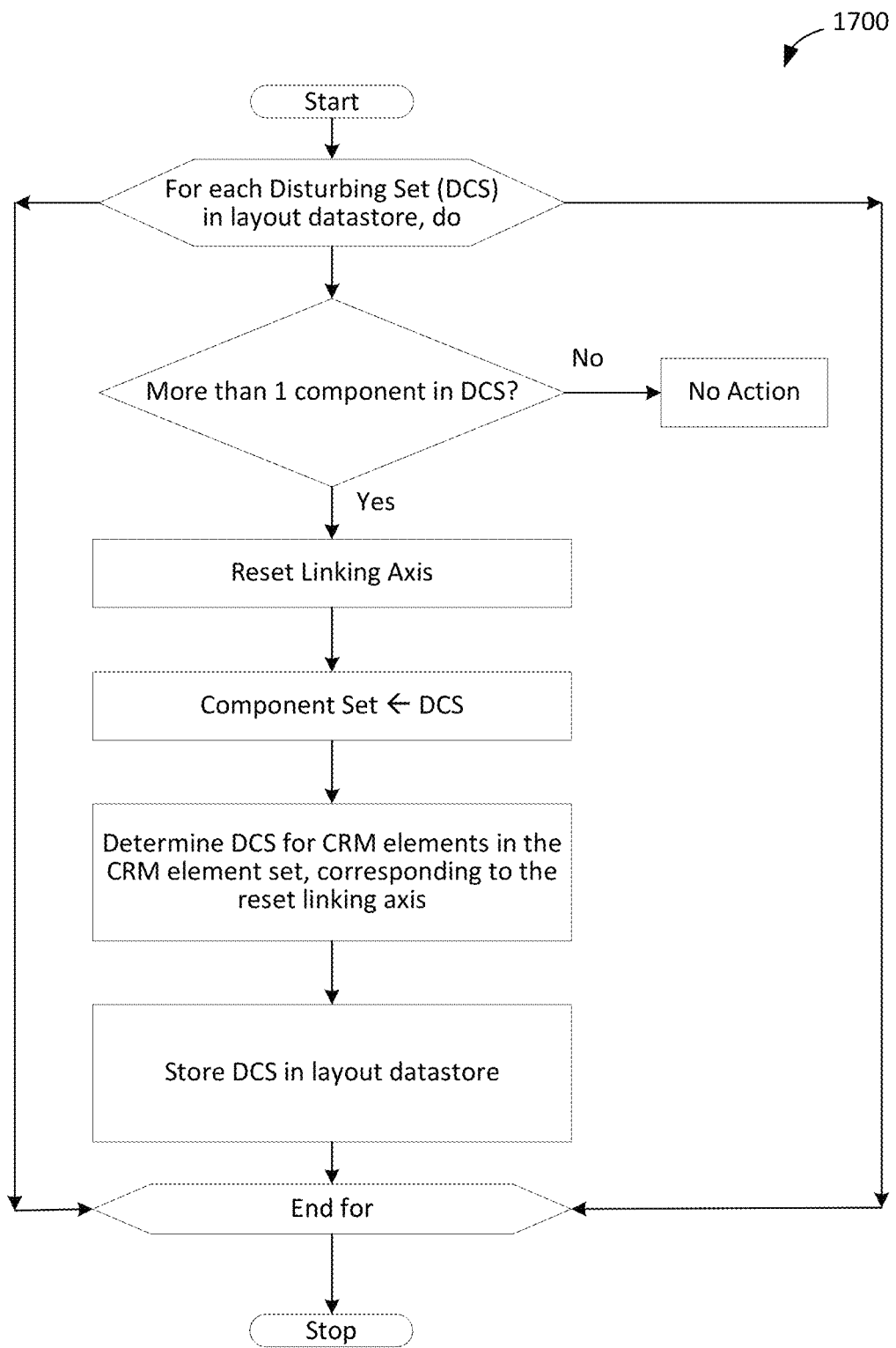
FIG. 17 is a flowchart of an example of a method of layout building operation.
Figure 18:
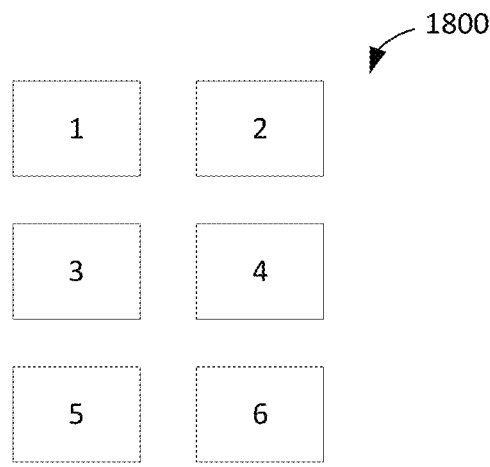
FIG. 18 is a sample screenshot of a layout with 6 CRM elements.

FIG. 17 is a flowchart 1700 of an example of a method of layout building engine operation. The process is carried out for each disturbing CRM element set (DCS) in the layout datastore. A check is made to determine if there are more than one CRM element in DCS. If there are more than one CRM element, then the DCS is considered as CRM element set. The DCS for the CRM elements in the CRM element set is determined corresponding to the reset linking axis, using the process in the flowchart in FIG. 16. The determined DCS is stored in the layout datastore. The operation of the flowcharts in FIG. 16 and FIG. 17, is further explained using a layout with 6 CRM elements (components) and a layout with 8 CRM elements (components) as below.

Example Using 6 Components

The process is described using a sample layout with 6 CRM elements (components). The main component set={1, 2,3,4,5,6} is fetched from component data storage. A linking axis e.g., vertical linking axis is fetched. The process begins with the selection of vertical linking axis because vertical CRM use case is preferred by users. Else if the user prefers horizontal CRM use case, then the process could begin with the selection of horizontal linking axis.

Figure 19:
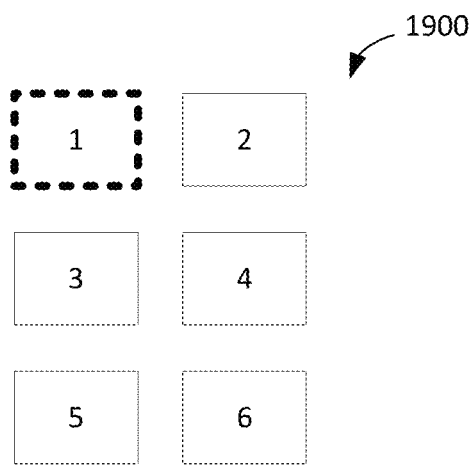
FIGS. 19-24 are sample screenshots of an imaginary wrapper around CRM elements.

The component "1" is selected, and its position coordinates are fetched. An imaginary wrapper is assigned around the component "1". FIG. 19 is a screenshot 1900 showing an imaginary wrapper along vertical axis around component (1).

Figure 20:
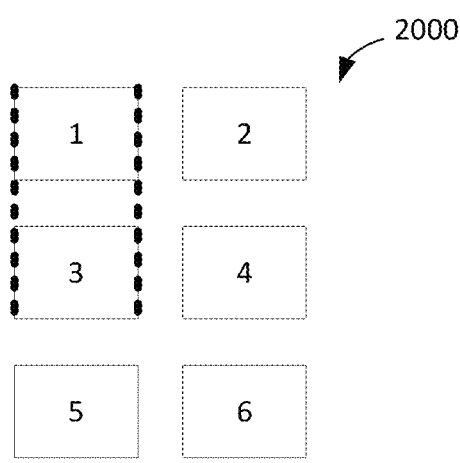

Determine the disturbing component for the imaginary wrapper (1), and the disturbing component is "3". Append the disturbing component along with the component and reset the imaginary wrapper to (1,3). FIG. 20 is a screenshot 2000 showing an imaginary wrapper along vertical axis around components (1,3). The component set is updated and becomes {2,4,5,6,(1,3)}.

Figure 21:
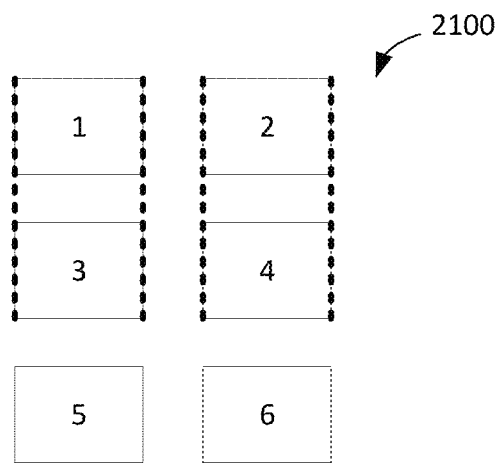

The component "2" is selected. An imaginary wrapper is assigned around the component "2". Determine the disturbing component for the imaginary wrapper (2), and the disturbing component is "4". Append the disturbing component and reset the imaginary wrapper, (2,4). The FIG. 21 is a screenshot 2100 showing an imaginary wrapper along vertical axis around disturbing components set (2,4) and (1,3). The component set is updated and becomes {5,6,(1,3), (2,4)}.

Figure 22:
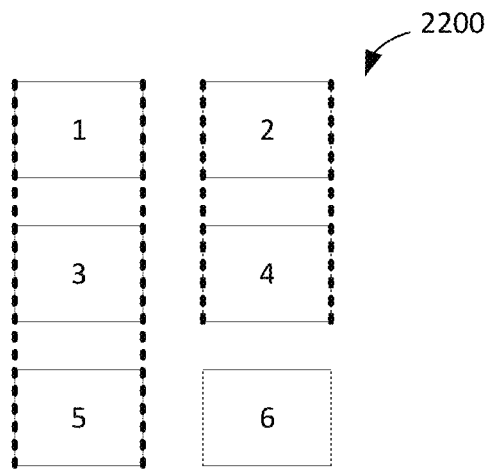

The component "5" is selected. An imaginary wrapper is assigned around the component "5". Determine the disturbing component for the imaginary wrapper (5), and the disturbing component is "(1,3)". Append the disturbing component and reset an imaginary wrapper (1,3,5). FIG. 22 is a screenshot 2200 showing an imaginary wrapper along vertical axis around disturbing component set (1,3,5) and (2,4). The component set is updated and becomes {6,(2,4), (1,3,5)}.

Figure 23:
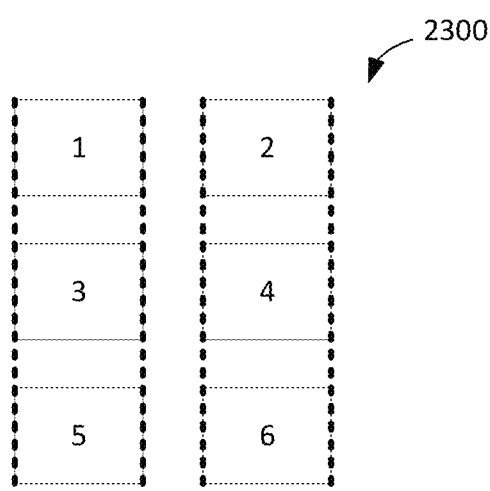

The component "6" is selected. An imaginary wrapper is assigned around the component "6". Determine the disturbing component for the imaginary wrapper (6), and the disturbing component is "(2,4)". Append the disturbing component and reset an imaginary wrapper, (2,4,6). FIG. 23 is a screenshot 2300 showing an imaginary wrapper along vertical axis around components (2,4,6) and (1,3,5). The component set is updated and becomes {(1,3,5),(2,4,6)}.

The component (1,3,5) is selected, an imaginary wrapper is assigned around the component "(1,3,5)". Determine the disturbing component for the imaginary wrapper. There is no disturbing component. Component set={(2,4,6)} and disturbing component set={1,3,5} is stored in layout data.

The component (2,4,6) is selected, an imaginary wrapper is assigned around the component "(2,4,6)". Determine the disturbing component for the imaginary wrapper. There is no disturbing component. component set={ } and disturbing component set={2,4,6} is stored in layout data.

The disturbing component sets in layout data is {1,3,5} and {2,4,6}.

Select the disturbing component set {1,3,5}. Since there is more than one component, reset the linking axis e.g., the horizontal linking axis in this case. Determine if each component in {1,3,5} has a disturbing component set corresponding to the horizontal linking axis.

Select the disturbing component set {1,3,5}. Now determine the disturbing components for "1" as in flowchart 1600 of FIG. 16. Select component "1" from {1,3,5}. An imaginary wrapper is assigned around the component "1". Determine the disturbing component for the imaginary wrapper (1). Since there are no disturbing components, the disturbing component set={1} is stored in layout data.

Next Component "3" is selected. An imaginary wrapper is assigned around the component "3". Determine the disturbing component for the imaginary wrapper (3), and there are no disturbing components. The disturbing component set={3} is stored in layout data.

Next Component "5" is selected. An imaginary wrapper is assigned around the component "5". Determine the disturbing component for the imaginary wrapper (5), and there are no disturbing components. The disturbing component set={5} is stored in layout data.

The {2,4,6} is selected. Since there is more than one component, reset the linking axis i.e. the horizontal linking axis in this case. Determine one or more disturbing component set for the components within the set {2,4,6} corresponding to the horizontal linking axis. Finally the disturbing component sets {2},{4} and {6} is stored in the layout data.

Figure 24:
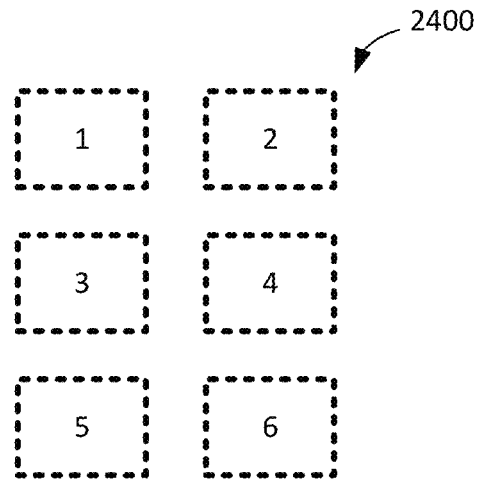

Now the layout data stores {1},{3},{5},{2},{4}, and {6} along with the processed sets {1,3,5}, and {2,4,6}. Since these sets comprise only one component, the process stops. The FIG. 24 is a screenshot 2400 showing an imaginary wrapper around components {1}{3}{5}{2}{4}{6}.

The components in the wrapper (1,3,5) are vertically linked/locked together. Hence, if the component 1 extends vertically downwards corresponding to the data, component 3 and component 5 are pushed vertically downwards. Suppose assume the component 3 extends vertically downwards corresponding to the data. Then the component 5 is pushed down but component 1 is unaffected as components are allowed to extend only in downward direction in vertical CRM use case.

The components in the wrapper (2,4,6) are vertically linked/locked together. Hence, if the component 2 extends vertically downwards corresponding to the data, component 4 and component 6 are pushed vertically downwards. Suppose the component 4 extends vertically downwards corresponding to the data. Then the component 6 is pushed down but component 2 is unaffected as components are allowed to extend only in downward direction in vertical CRM use case.

Example Using 8 Components

Figure 25:
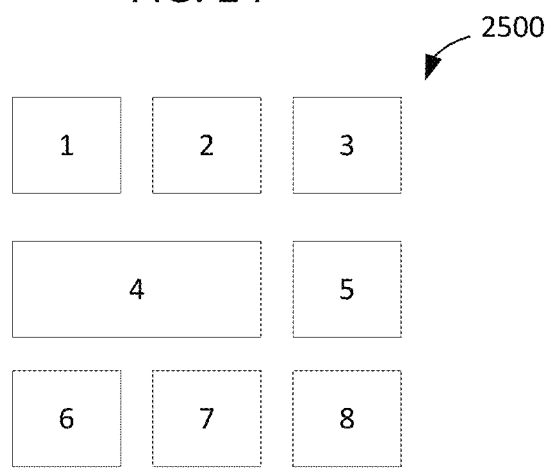
FIG. 25 is a sample screenshot of a layout with 8 CRM elements.

The main component set has 8 components of {1,2,3,4,5,6,7,8} as shown in screenshot 2500 in FIG. 25. The vertical linking axis is selected. The process begins with the selection of vertical linking axis because vertical CRM use case is preferred by users. Else if the user prefers horizontal CRM use case, then the process could begin with the selection of horizontal linking axis.

Figure 26:
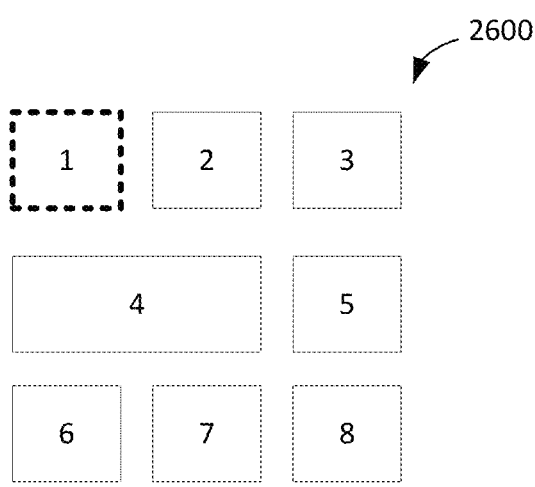
FIGS. 26-37 are sample screenshots of an imaginary wrapper around CRM elements.

The component "1" is selected, an imaginary wrapper is assigned around the component "1". FIG. 26 is a screenshot 2600 showing an imaginary wrapper along vertical axis around component (1).

Figure 27:
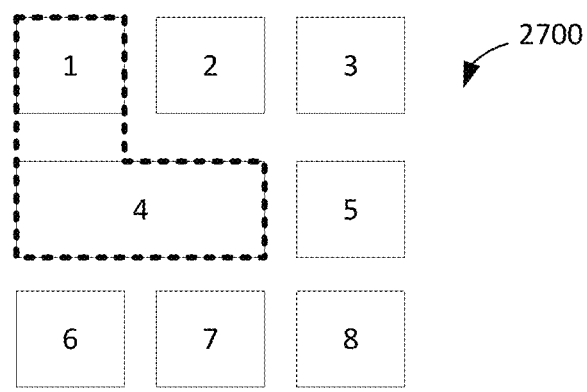

Determine the disturbing component for the imaginary wrapper (1), and the disturbing component is "4". Append the disturbing component and reset the imaginary wrapper, (1,4). FIG. 27 is a screenshot 2700 showing an imaginary wrapper along vertical axis around disturbing component set (1,4). The component set is updated and becomes {2,3,5,6,7,8,(1,4)}.

Figure 28:
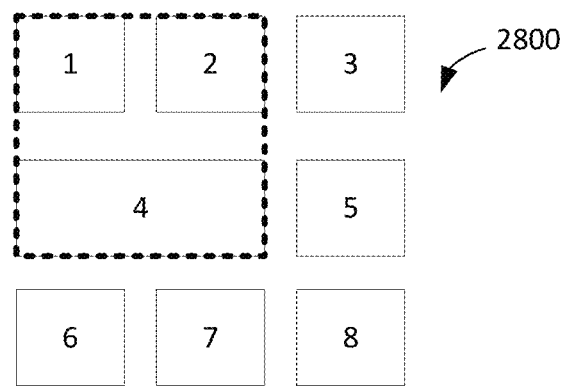

The component "2" is selected, and an imaginary wrapper is assigned around the component "2". Determine the disturbing component for the imaginary wrapper (2), the disturbing component is (1,4). Append the disturbing component and reset the imaginary wrapper, (1,2,4). The FIG. 28 is a screenshot 2800 showing an imaginary wrapper along vertical axis around (1,2,4). The component set becomes {3,5,6,7,8,(1,2,4)}.

Figure 29:
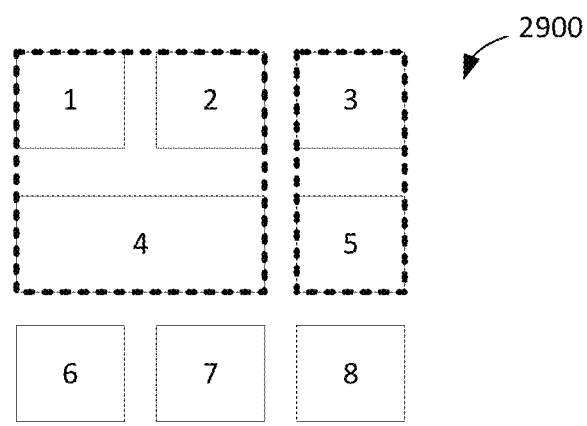

The component "3" is selected, and an imaginary wrapper is assigned around the component "3". Determine the disturbing component for the imaginary wrapper (3), the disturbing component is "5". Append the disturbing component and reset the imaginary wrapper, (3,5). The FIG. 29 is a screenshot 2900 showing imaginary wrappers along vertical axis around (3,5) and (1,2,4). The component set becomes {6,7,8,(1,2,4),(3,5)}.

Figure 30:
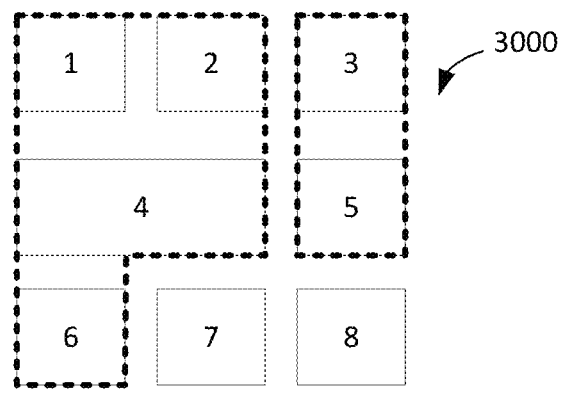

The component "6" is selected, and an imaginary wrapper is assigned around the component "6". Determine the disturbing component for the imaginary wrapper (6), the disturbing component is "(1,2,4)". Append the disturbing component and reset the imaginary wrapper, (1,2,4,6). The FIG. 30 is a screenshot 3000 showing an imaginary wrapper along vertical axis around the disturbing component set (1,2,4,6) and (3,5). The component set becomes {7,8,(1,2,4,6),(3,5)}.

Figure 31:
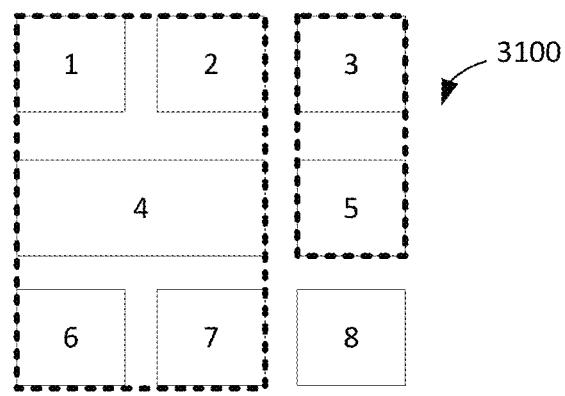

The component "7" is selected, an imaginary wrapper is assigned around the component "7". Determine the disturbing component for the imaginary wrapper (7), the disturbing component is (1,2,4,6). Append the disturbing component and reset the imaginary wrapper, a {(1,2,4,6,7)}. FIG. 31 is a screenshot 3100 showing an imaginary wrapper along vertical axis around the disturbing components (1,2,4,6,7) and (3,5). The component set becomes {8,(1,2,4,6,7),(3,5)}.

Figure 32:
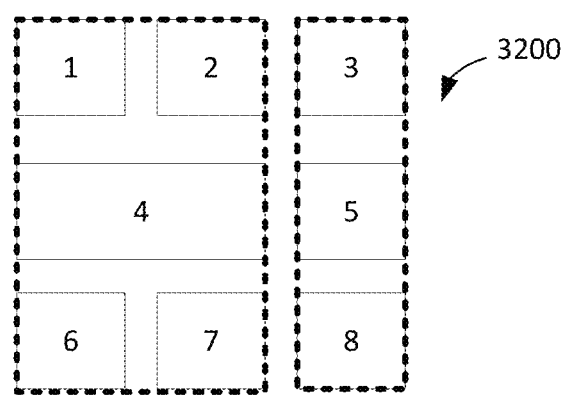

The component "8" is selected, and an imaginary wrapper is assigned around the component "8". Determine the disturbing component for the imaginary wrapper (8), the disturbing component is (3,5). Append the disturbing component and reset the imaginary wrapper, (3,5,8). The FIG. 32 is a screenshot 3200 showing an imaginary wrapper along vertical axis around (3,5,8). The component set becomes {(1,2,4,6,7),(3,5,8)}.

The component (1,2,4,6,7) is selected and an imaginary wrapper is assigned around the component "(1,2,4,6,7)". Determine the disturbing component for the imaginary wrapper. There is no disturbing component. The disturbing component set={1,2,4,6,7} is generated and stored in layout data.

The component (3,5,8) is selected, and an imaginary wrapper is assigned around the component "(3,5,8)". Determine the disturbing component for the imaginary wrapper. There is no disturbing component. The disturbing component set={3,5,8} is stored in the layout data.

Each disturbing component set in layout data, i.e. {1,2,4,6,7} and {3,5,8} is processed as follows. If there is more than one component in the disturbing component set, the linking axis is reset. Hence the horizontal linking axis is assigned. For each disturbing component set consider it be a component set and determine disturbing component set(s) for the components in the component set, corresponding to the horizontal linking axis, as shown in flowchart 1600 of FIG. 16.

Figure 33:
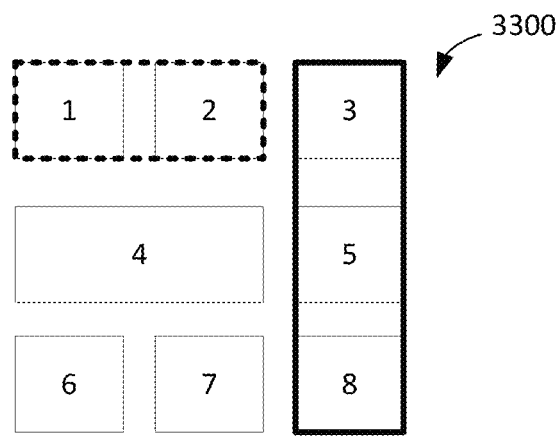

For disturbing component set={1,2,4,6,7}, consider it to be a component set={1,2,4,6,7}. Component "1" is selected. An imaginary wrapper is assigned around the component "1". Determine the disturbing component for the imaginary wrapper (1), the disturbing component is "2". Append the disturbing component and reset the imaginary wrapper, (1,2). FIG. 33 is a screenshot 3300 showing an imaginary wrapper along horizontal axis around (1,2), and along vertical axis around disturbing component set {3,5,8}. The component set becomes {4,6,7,(1,2)}.

Figure 34:
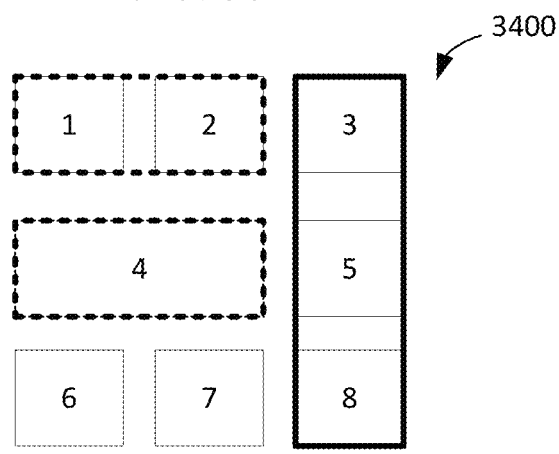

Component "4" is selected, an imaginary wrapper is assigned around the component "4". Determine the disturbing component for the imaginary wrapper (4), there is no disturbing component. FIG. 34 is a screenshot 3400 showing an imaginary wrapper along horizontal axis around component (4). The distributed component set={4} is generated and stored in layout data.

Figure 35:
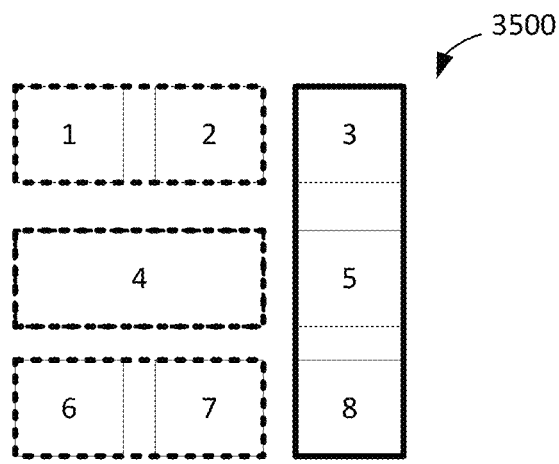

Component "6" is selected. An imaginary wrapper is assigned around the component "6". Determine the disturbing component for the imaginary wrapper (6), the disturbing component is "7". Append the disturbing component and reset the imaginary wrapper, (6,7). FIG. 35 is a screenshot 3500 showing an imaginary wrapper along horizontal axis around disturbing component set (6,7), (1,2), (4); and along vertical axis around disturbing component set (3,5,8).

Select disturbing component set {3,5,8} from layout data. Component "3" is selected, an imaginary wrapper is assigned around the component "3". Determine the disturbing component for the imaginary wrapper (3), there is no disturbing component. The disturbing component set {3} is generated and stored in layout data.

Component "5" is selected, an imaginary wrapper is assigned around the component "5". Determine the disturbing component for the imaginary wrapper, there is no disturbing component. The disturbing component set {5} is generated and stored in layout data.

Figure 36:
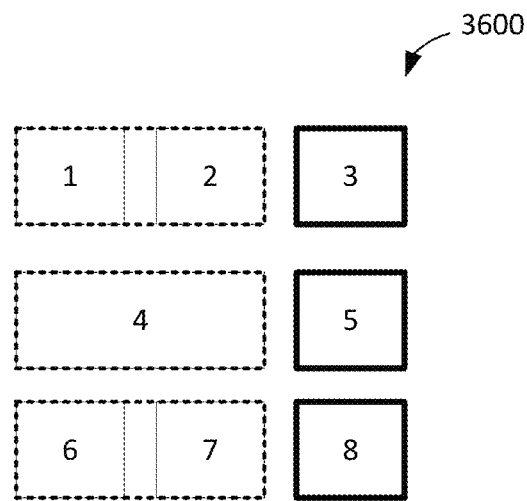

Component "8" is selected, an imaginary wrapper is assigned around the component "8". Determine the disturbing component for the imaginary wrapper, there is no disturbing component. The disturbing component set {8} is generated and stored in layout data. FIG. 36 is a screenshot 3600 showing the imaginary wrapper along horizontal axis around disturbing components set (1,2),(4),(6,7); and imaginary wrappers around (3),(5),(8).

For disturbing component set {1,2}; Consider it to be a component set {1,2}. The linking axis is reset to the vertical axis. Component "1" is selected, an imaginary wrapper is assigned around the component "1". Determine the disturbing component for the imaginary wrapper, there is no disturbing component. The disturbing component set {1} is generated and stored in layout data.

Next Component "2" is selected from the component set {1,2}, an imaginary wrapper is assigned around the component "2". Determine the disturbing component for the imaginary wrapper, there is no disturbing component. The disturbing component set {2} is generated and stored in layout data.

For disturbing component set {6,7}; Consider it to be a component set {6,7}. The linking axis is reset to the vertical axis. The Component "6" is selected, an imaginary wrapper is assigned around the component "6". Determine the disturbing component for the imaginary wrapper, there is no disturbing component. The disturbing component set {6} is generated and stored in layout data.

Figure 37:
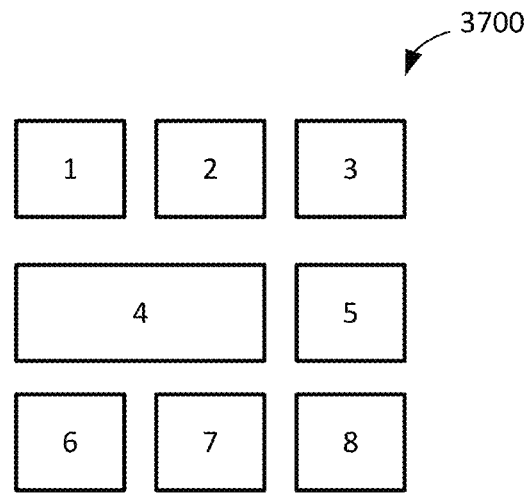

Next Component "7" is selected from the component set {6,7}, an imaginary wrapper is assigned around the component "7". Determine the disturbing component for the imaginary wrapper, there is no disturbing component. The disturbing component set {7} is generated and stored in layout data. FIG. 37 is a screenshot 3700 showing the disturbing component sets {1},{2},{3},{4},{5},{6},{7},{8}. Since these disturbing component sets in the layout data have only one component each, the process stops.

Consider the disturbing component set {1,2,4,6,7}. The components in the wrapper (1,2) form a disturbing component set {1,2}, and are horizontally linked/locked together. The components in the wrapper (6,7) form a disturbing component set {6,7}, and are horizontally linked/locked together. The component 4 in the wrapper (4), forms a disturbing component set {4} indicating that it is not linked horizontally with any other components. The sets {1,4}, {4} and {6,7} are vertically linked/locked together. Hence, if the component 1 extends vertically downwards, component 2 which is horizontally linked to component 1, is not disturbed. The sets {4} and {6,7} are pushed vertically downwards. The disturbing component set {3,5,8} is not disturbed as it is not linked with the set {1,2,4,6,7}.

The CRM application has specific CRM components and CRM data type that would cause the bottom/lower edge of a component to extend downward or shrink upward. There could be many instances in the CRM application where there is a component's size change to handle the dynamic data.

Figure 38:
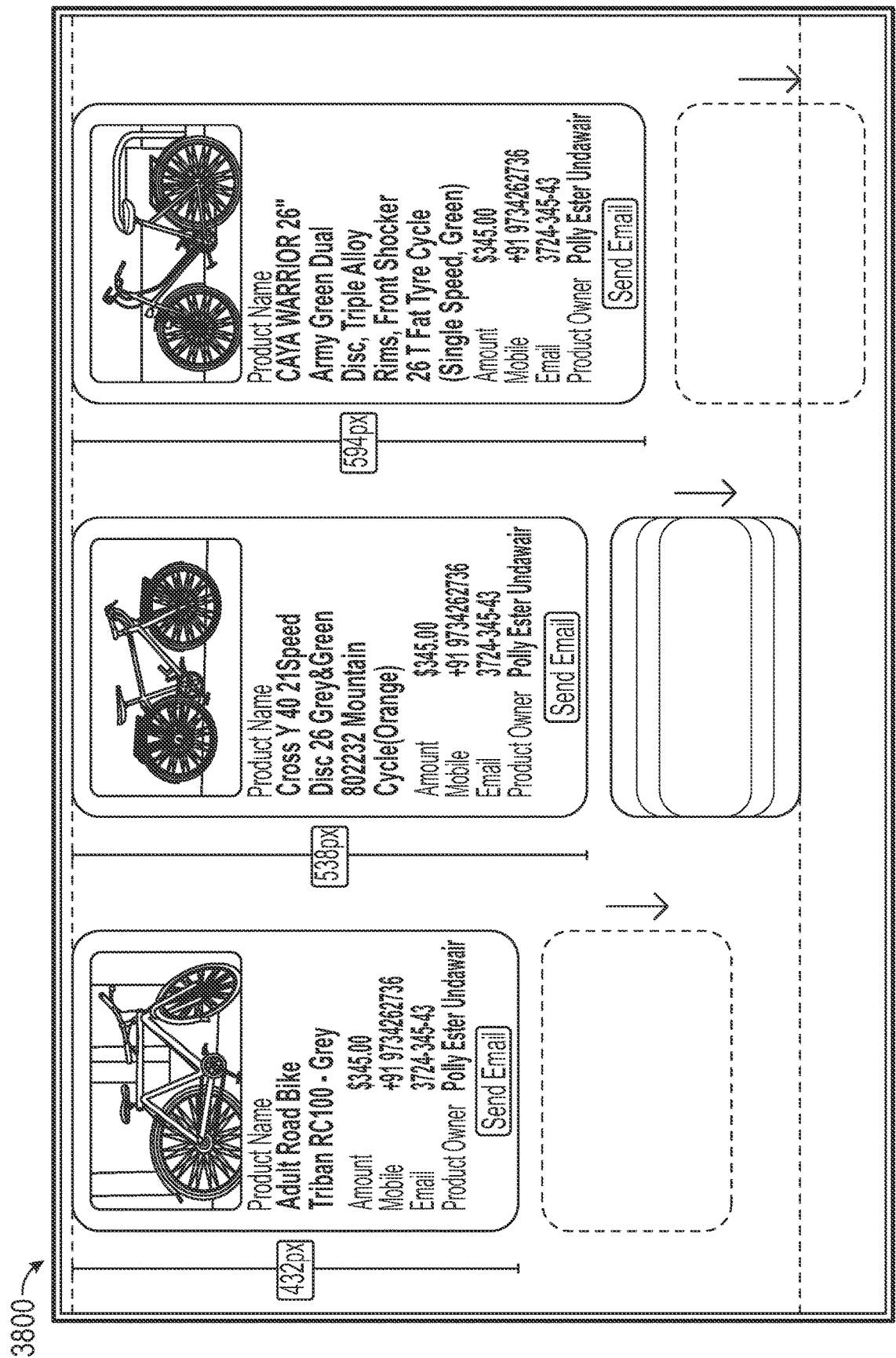
FIG. 38 is a sample screenshot of a CRM application illustrating a product name CRM element.

FIG. 38 is a sample screenshot 3800 of a CRM application illustrating a product name CRM element. The product name CRM element extends vertically downwards corresponding to the data. When the data within the CRM element product description increases in size, it pushes down the CRM elements under it.

Figure 39:
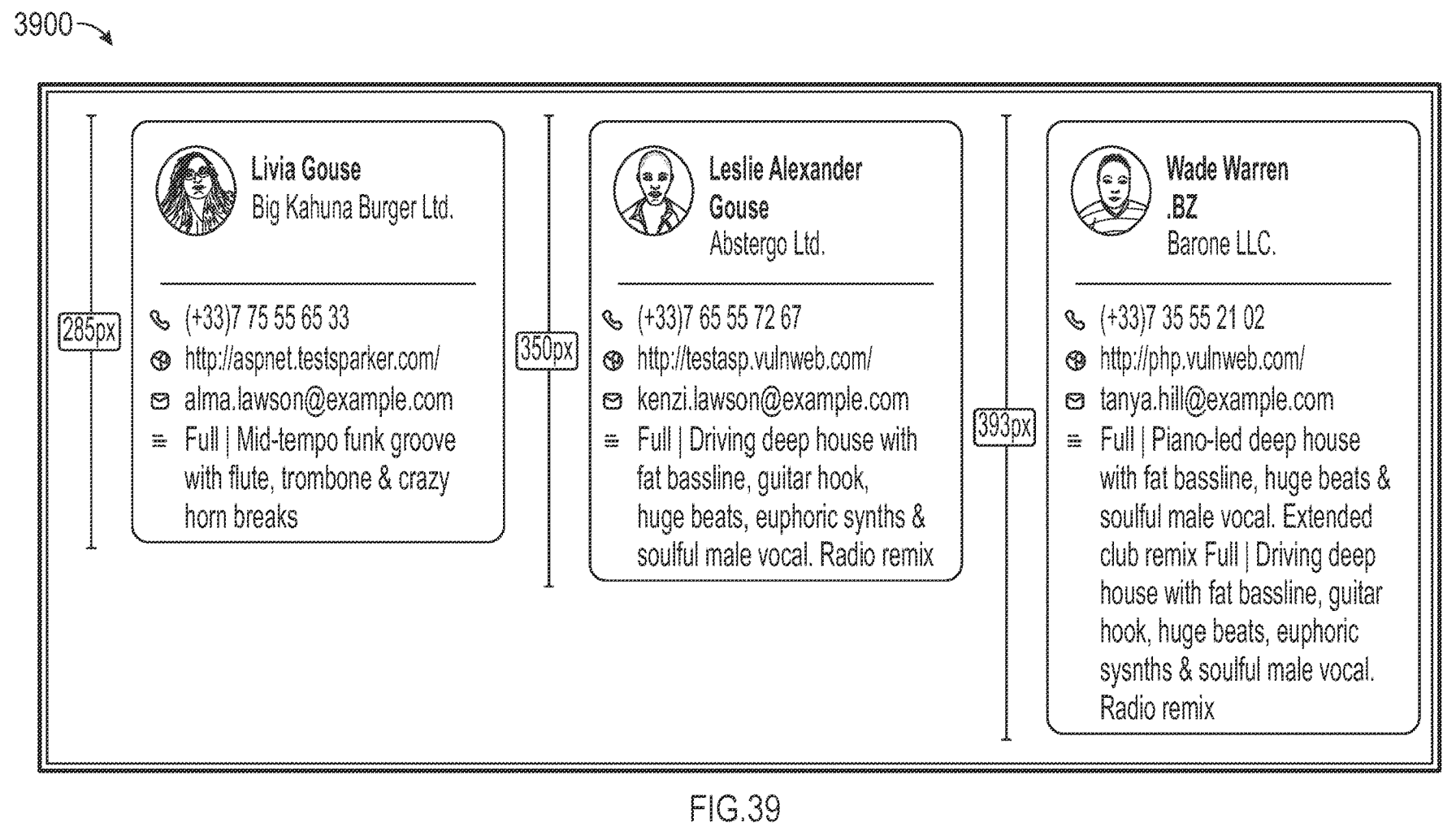

FIG. 39 is a sample screenshot 3900 of a CRM application illustrating a customer profile CRM element. The customer profile CRM element extends vertically in the downward direction. When the data within the CRM element customer details data increases in size, the CRM element is extended vertically downwards. Other such instances include product information, product description, product name, customer name, customer profile, customer address, etc. where the CRM element extends vertically downwards corresponding to the data.

Figure 40:
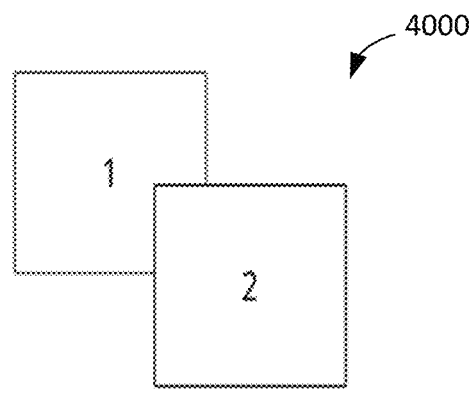
FIGS. 40-47 are sample screenshots of CRM elements overlapping one another.

When CRM elements are placed on a canvas, there could be design scenarios where CRM elements get overlapped, based on the business requirement. The overlapping CRM elements are handled before generating a layout. In FIG. 40, two CRM elements are shown overlapping each other, e.g., placed one on the other, in screenshot 4000. For example, in the figure, two CRM elements namely CRM element 1 and CRM element 2 are shown to overlap each other. CRM element 2 can be referred to as a hiding CRM element and CRM element 1 can be referred to as a hidden CRM element. The layout building engine cannot generate a layout for the overlapping CRM elements as such. Hence, they must be handled before layout generation.

The overlapping of the CRM elements is handled using the following mechanism:
  Step 1: Fetch the overlapping CRM elements, e.g., CRM element 1 and CRM element 2 as in FIG. 40.
  Step 2: Resize the CRM element 2 which hides CRM element 1, while storing the original position coordinates of the CRM element 2 along with the layout data of the CRM element 2.

Step 3: Generate layout including CRM element 1 and resized CRM element 2.

Step 4: Render the CRM element 2 with its original size using the original position coordinates of the CRM element 2 stored in the layout data.

Figure 41:
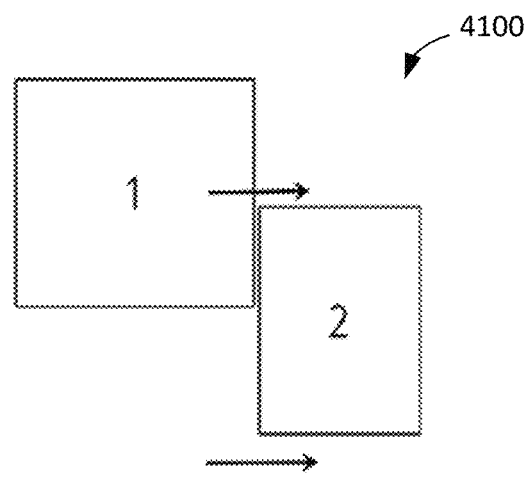
Figure 42:
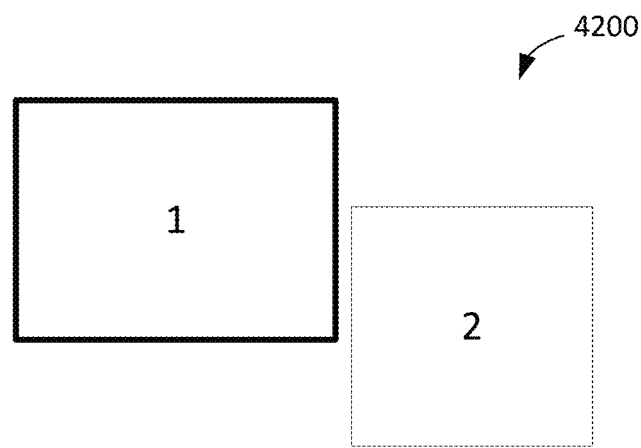
Figure 43:
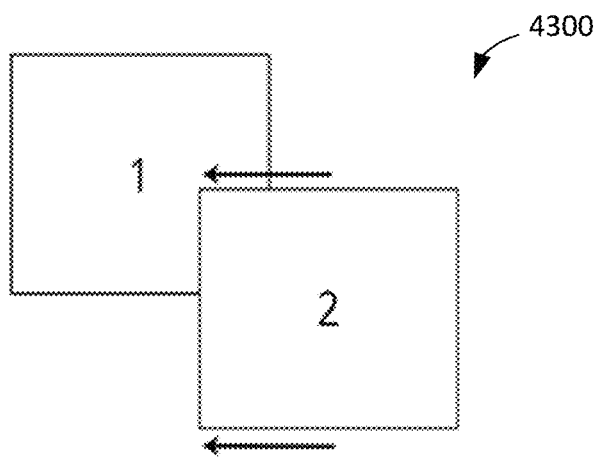

We refer once again to FIG. 40, which illustrates a bottom right overlapping CRM element. The CRM element 2 overlaps over the CRM element 1, hence CRM element 2 is resized. FIG. 41 is a sample screenshot 4100 illustrating resizing the CRM element 2 to its right. The CRM element 2 is resized such that if the CRM element 1 ends at x pixel, the CRM element 2 starts from x+1 pixel. FIG. 42 is a screenshot 4200 illustrating the layout generated for CRM elements 1 and 2, as two individual wrapped CRM elements. FIG. 43 is a sample screenshot 4300 of the CRM element 2 being rendered to its original size.

Figure 44:
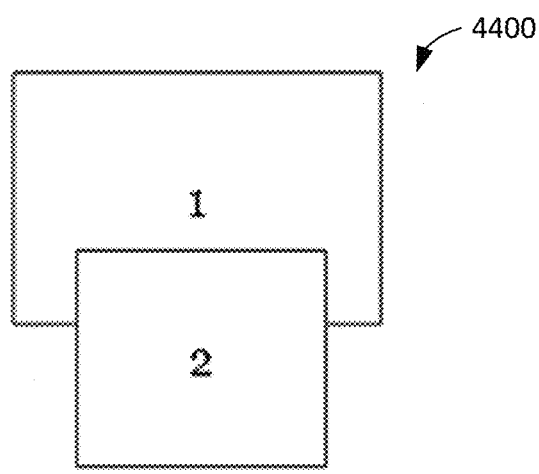
Figure 45:
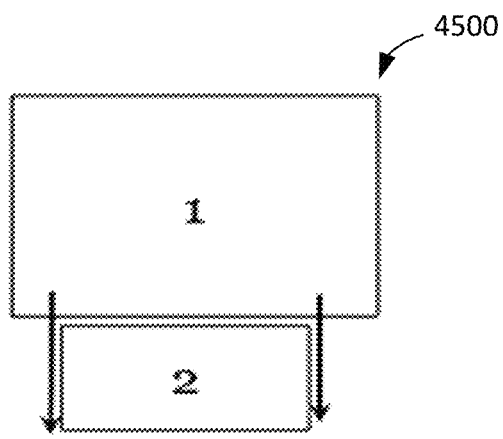
Figure 46:
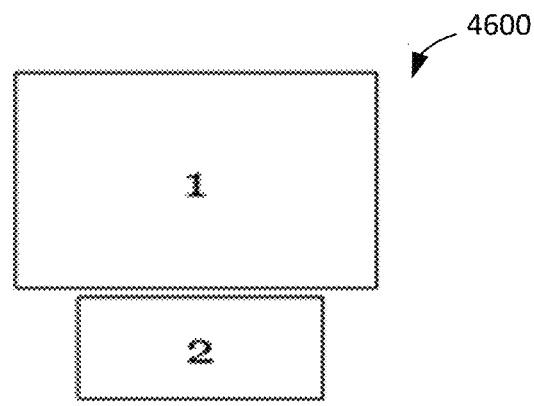
Figure 47:
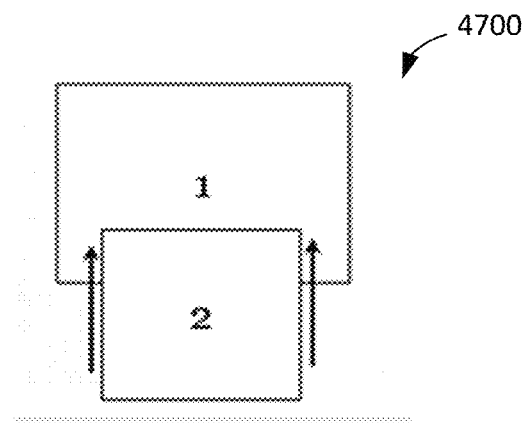

FIG. 44 is a screenshot 4400 illustrating a bottom center overlapping CRM element. The CRM element 2 overlaps over the CRM element 1, hence CRM element 2 needs to be resized. FIG. 45 is a screenshot 4500 illustrating resizing the CRM element 2 to the bottom. If CRM element "1" ends at y pixel, the CRM element "2" starts at y+1 pixel. FIG. 46 is a screenshot 4600 illustrating layout generation with the second CRM element being resized to the bottom and they are wrapped as one CRM element along a vertical axis. FIG. 47 is a screenshot 4700 illustrating the CRM element 2 being rendered to its original size.

Figure 48:
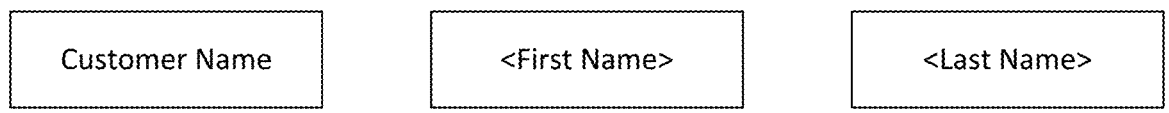
FIG. 48 is a sample screenshot of 3 CRM elements placed on the canvas.
Figure 49:
FIG. 49 is a sample screenshot of linking of 3 CRM elements placed on the canvas.
Figure 50:
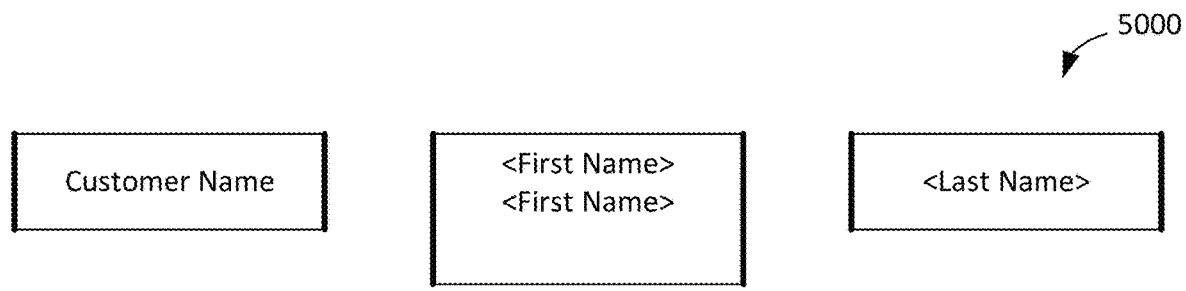
FIG. 50 is a sample screenshot of a first name CRM element.

In CRM applications there are some scenarios where CRM elements could be extended horizontally even when the CRM elements are linked/locked vertically. FIG. 48 is a sample screenshot 4800 of 3 CRM elements, namely customer name, first name, and last name, placed on a canvas. Also assume the 3 CRM elements are linked/locked vertically. FIG. 49 is a sample screenshot 4900 which illustrates the vertical linking/locking of the first name and last name CRM element during layout generation. FIG. 50 is a sample screenshot 5000 to illustrate the usual scenario where the first name CRM element extends vertically downwards. Now if the user prefers to extend the first name CRM element horizontally, then the data may overlap on the last name CRM element, because they are linked/locked vertically. The merging operation solves the issue. The user can merge the first name and last name CRM elements while placing them on the canvas.

Figure 51:
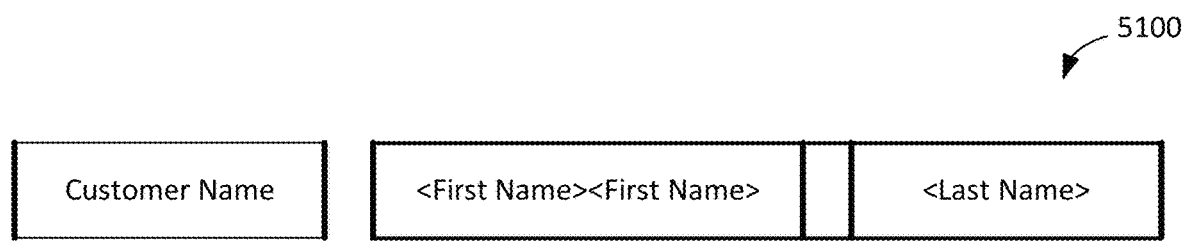
FIG. 51 is a sample screenshot of merging first name and last name CRM elements.

The first name is merged with the last name CRM element as depicted in screenshot 5100 of FIG. 51. While rendering the merged CRM elements (the first name CRM element and the last name CRM element), the first name CRM element extends horizontally if required, based on the size of the data. The last name CRM element moves horizontally rightwards corresponding to the increase in the size of the first name component.

Figure 52:
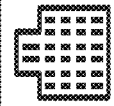
FIG. 52 is a sample screenshot of a client's detail page design for a real estate agent.
Figure 54:
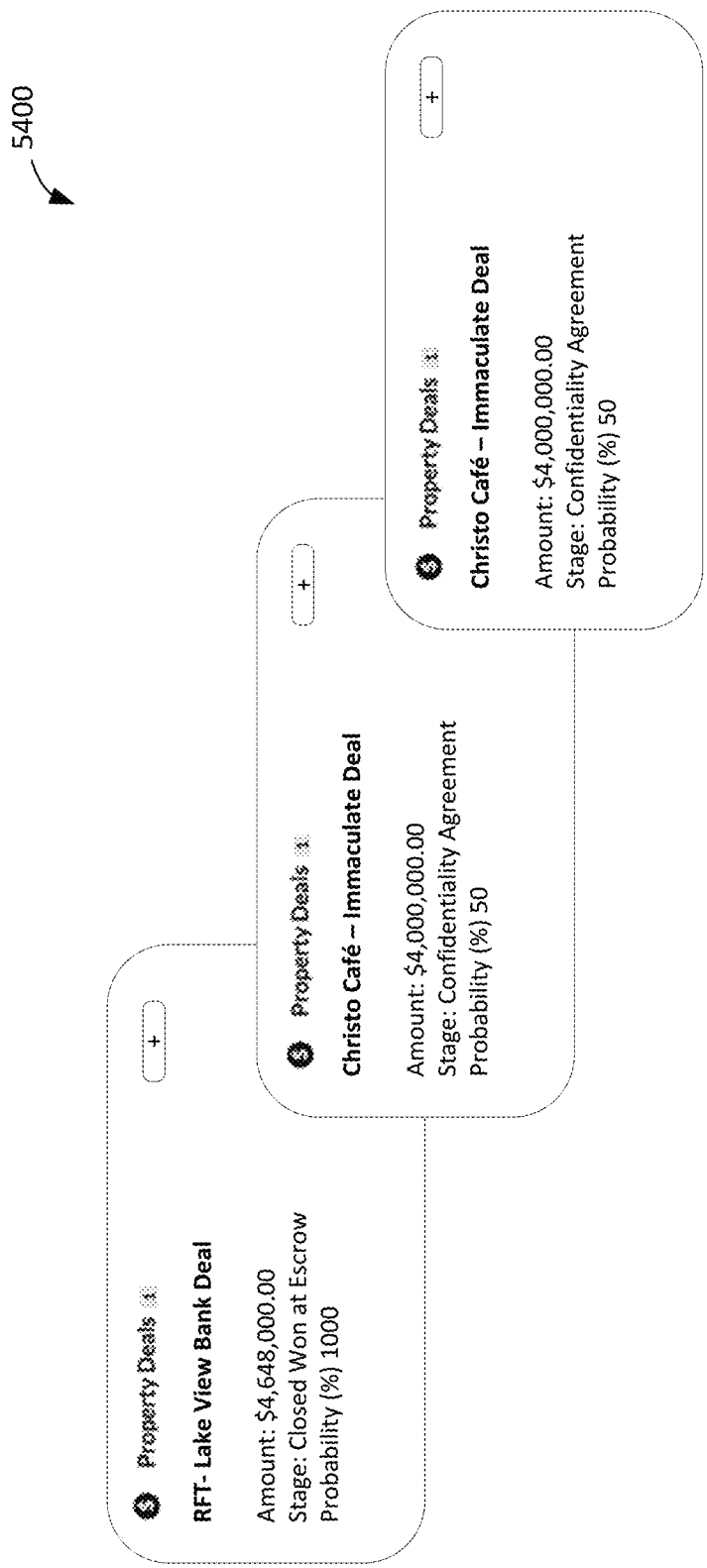
FIG. 54 is a sample screenshot that illustrates conditional styling.

FIG. 52 is a sample screenshot 5200 of a client's detail page design for a real estate agent. FIG. 53 is a sample screenshot 5300 of a client's detail page design for a marketing agent. FIG. 54 is a sample screenshot 5400 that illustrates conditional styling.

Benefits of CRM page design system include:
(i) Offering Data Reorganization
CRM page design system offers control over how data is presented in CRM. If the design and layout of a record detail page are rigid, in which the fields are represented in a standard two-column layout, and the related lists are arranged one below the other in a linear fashion, even if it displays all pieces of information, considering the volume of data, it may take a while to find what is exactly needed. The rigid structure makes it difficult to retrieve data.

An organization may have a design protocol that doesn't align with the default CRM design. There might be a need to redesign the customer's page so that all the relevant pieces of information are highlighted well instead of being hidden away down several scrolls of the page.

(ii) Offering Page Optimization
By designing a page using a CRM page design system, it not only makes the page more attractive visually, but also makes it more effective. It makes it possible to reorganize components, decide exactly what to be seen on the page and make sure that the required data is available on the top fold. This optimization on the page makes data retrieval much easier and ultimately makes the page very effective.

(iii) Offering Bespoke Design
In the CRM e.g., ZOHO CRM, the UI comes with a default design to present business data. Every piece of information keyed into the database about a specific entry is stored on its corresponding "record detail page". While the detail page is indeed informative and functional, it follows a vanilla design to display data, and hence may not meet the dynamic design challenges of thousands of organizations across the application's user base. While one organization prefers a more formal design, another may opt for something cooler and casual. While one company might want their website theme to reflect on their CRM pages, another might opt for something radically different.

This is where the CRM page design system enters the picture. With CRM page design system, every visual aspect of record detail page, e.g., the font, background image, color, size, style, and illustrations, can be customized. The canvas UI offers the tools to build a detail page from scratch depending on the organization's design protocol, people, processes and similar factors. The layout is then generated from the design. There is a chance of the custom designs being shared with relevant teams, thereby creating a fully customized platform that's attractive, effective and connects with the organization better.

(iv) Offering Profile-Based Customization
The CRM page design system offers an additional layer of customization, where it is possible to create different layouts of the same detail page to suit the different responsibilities and functions of various departments in an organization. For instance, a real estate agent pursuing a deal may be focused on property details and upcoming activities with a customer, whereas the marketing specialist working on the same deal might be more interested in the social media scene and campaign activities. So, the same customer record detail page can be presented differently for each profile, keeping in mind what's relevant to them and in a way that facilitates them to carry out their responsibilities easily. FIGS. 52 and 53 depict the screenshot of client's detail page for a real estate agent and for a marketing agent. This profile-based customization is a compelling, key feature of canvas for CRM.

(v) Offering Conditional Styling and Visibility
The CRM page design system offers a feature called conditional styling and visibility, which essentially allows visual cues on the page that vary for every customer record based on specific conditions; this way, the canvas experience for every record is dynamic and highly contextual. For instance, user can dictate canvas rules that say the highlight on the Stage field of every deal will differ based on the exact value—green for "Closed Won" deals, red for "Closed Lost" deals and other specific colors for stages in-between. FIG. 54 gives the screenshot illustrating the function of conditional styling. This way, the moment the record is rendered, the viewer can catch a glimpse of all "Closed Lost" and "Closed Won" deals. The information is gathered automatically without even having to take a closer look. This is just a tiny example—with this UI it is possible to dictate the styling and visibility of components on a page for a range of contexts and scenarios to arrive at a highly rich, meaningful, and dynamic user experience.

What is claimed is:

1. A method comprising:
 locking a first customer relationship management (CRM) element with a unidirectional expansion vector and a second CRM element in a layout that is a disturbing CRM element of the first CRM element of a dynamic CRM page layout, wherein the unidirectional expansion vector includes a static direction and a variable magnitude and the first CRM element includes a graphical display component, a fixed position coordinate at a first boundary of the graphical display component, and a dynamic position coordinate at a second boundary of the graphical display component opposite the first boundary in the static direction of the unidirectional expansion vector;
 obtaining first layout data of the first CRM element and second layout data of the second CRM element while instantiating the first CRM element, wherein instantiating the first CRM element includes identifying CRM data for display within the first CRM element and wherein the variable magnitude of the unidirectional expansion vector is determined by how much size is required to display the CRM data in the graphical display component of the first CRM element;
 extending the second boundary of the graphical display component of the first CRM element by the variable magnitude of the unidirectional expansion vector in the static direction associated with the unidirectional expansion vector, wherein a dynamic position coordinate value is adjusted in the static direction as dictated by the magnitude of the unidirectional expansion vector;
 positioning the second CRM element beyond the second boundary of the graphical display component of the first CRM element in the static direction on the dynamic CRM page;
 fetching a component set comprising the first CRM element and the second CRM element;
 fetching a linking axis that represents the unidirectional expansion vector with which the first and second CRM elements are locked by a layout building engine;
 for each CRM element in the component set, fetching position coordinates (PC) for the component, assigning an imaginary wrapper for the component, determining PC for the imaginary wrapper corresponding to the PC of the component, and determining a set of disturbing components corresponding to the PC for the imaginary wrapper and linking axis, wherein the imaginary wrapper represents a set including at least one CRM element from the component set;
 comprising, for each CRM element in the component set with no disturbing components:
 updating the component set by removing the imaginary wrapper that has no disturbing component;
 generating a disturbing component set (DCS) that includes components in the imaginary wrapper;
 adding the DCS to the first layout data of the first CRM element and the second layout data of the second CRM element, wherein the first layout data of the first CRM element and the second layout data of the second CRM element are stored in a layout datastore;
 resetting the linking axis to a horizontal axis;
 adding each DCS instance to the component set;
 determining additional DCS for components in the component set corresponding to the reset linking axis;
 adding the additional DCS to the layout datastore.

2. The method of claim 1 comprising locking a third CRM element in the layout of the dynamic CRM page, wherein the second CRM element and the third CRM element comprise a set of disturbing CRM elements of the first CRM element.

3. The method of claim 1, wherein the unidirectional expansion vector is a first unidirectional expansion vector and the second CRM element has a second unidirectional expansion vector, comprising locking a third CRM element in the layout of the dynamic CRM page, wherein the second CRM element and the third CRM element comprise a set of disturbing CRM elements of the first CRM element.

4. The method of claim 1 comprising, for each CRM element in the component set, appending the disturbing components into the imaginary wrapper.

5. The method of claim 1 comprising resetting the PC for the imaginary wrapper corresponding to PC of the disturbing components, wherein resetting the PC involves obtaining the PC of each CRM element within the imaginary wrapper, and modifying the PC corresponding to the obtained PC of each CRM element.

6. The method of claim 1 comprising updating the component set by removing the first CRM element and the set of disturbing components of the first CRM element.

7. The method of claim 1 comprising adding the imaginary wrapper, with modified PC, as a new component, to the component set.

8. A system comprising:
 one or more processors; and
 memory storing instructions that, when executed by the one or more processors, cause the system to perform:
 locking a first customer relationship management (CRM) element with a unidirectional expansion vector and a second CRM element which is determined to be a disturbing CRM element of the first CRM element, thereby creating a layout including layout data of the first and second CRM elements of a dynamic CRM page, wherein the unidirectional expansion vector includes a static direction and a variable magnitude and the first CRM element includes a graphical display component, a fixed position coordinate at a first boundary of the graphical display component, and a dynamic position coordinate at a second boundary of the graphical display component opposite the first boundary in the static direction of the unidirectional expansion vector;
 instantiating the first CRM element, wherein instantiating the first CRM element includes identifying CRM data for display within the first CRM element and wherein the variable magnitude of the unidirectional expansion vector is determined by how much size is required to display the CRM data in the graphical display component of the first CRM element;

referring the layout data of the first CRM element and the layout data of the second CRM element which is a disturbing CRM element of the first CRM element;

extending the second boundary of the graphical display component of the first CRM element by the variable magnitude of the unidirectional expansion vector in the static direction associated with the unidirectional expansion vector, wherein a dynamic position coordinate value is adjusted in the static direction as dictated by the magnitude of the unidirectional expansion vector;

positioning the second CRM element beyond the second boundary of the graphical display component of the first CRM element in the static direction on the dynamic CRM page;

fetching a component set comprising the first CRM element and the second CRM element;

fetching a linking axis that represents the unidirectional expansion vector with which the first and second CRM elements are locked by a layout building engine;

for each CRM element in the component set, fetching position coordinates (PC) for the component, assigning an imaginary wrapper for the component, determining PC for the imaginary wrapper corresponding to the PC of the component, and determining a set of disturbing components corresponding to the PC for the imaginary wrapper and linking axis, wherein the imaginary wrapper represents a set including at least one CRM element from the component set;

comprising, for each CRM element in the component set with no disturbing components;

updating the component set by removing the imaginary wrapper that has no disturbing component;

generating a disturbing component set (DCS) that includes components in the imaginary wrapper;

adding the DCS to the first layout data of the first CRM element and the second layout data of the second CRM element, wherein the first layout data of the first CRM element and the second layout data of the second CRM element are stored in a layout datastore;

resetting the linking axis to a horizontal axis;

adding each DCS instance to the component set;

determining additional DCS for components in the component set corresponding to the reset linking axis;

adding the additional DCS to the layout datastore.

9. The system of claim 8, wherein the instructions cause the system to perform locking a third CRM element in the layout of the dynamic CRM page, wherein the second CRM element and the third CRM element comprise a set of disturbing CRM elements of the first CRM element.

10. The system of claim 8, wherein the unidirectional expansion vector is a first unidirectional expansion vector and the second CRM element has a second unidirectional expansion vector, the instructions causing the system to perform locking a third CRM element in the layout of the dynamic CRM page, wherein the second CRM element and the third CRM element comprise a set of disturbing CRM elements of the first CRM element.

11. The system of claim 8, wherein the instructions cause the system to perform, for each CRM element in the component set, appending the disturbing components into the imaginary wrapper.

12. The system of claim 8, wherein the instructions cause the system to perform resetting the PC for the imaginary wrapper corresponding to PC of the disturbing components, wherein the resetting involves obtaining the PC of each CRM element within the imaginary wrapper, and modifying the PC for the imaginary wrapper corresponding to the obtained PC of each CRM element within the imaginary wrapper.

13. The system of claim 8, wherein the instructions cause the system to perform updating the component set by removing the first CRM element and the set of disturbing components of the first CRM element.

14. The system of claim 12, wherein the instructions cause the system to perform adding the imaginary wrapper, with modified PC, as a new component to the component set.

* * * * *